United States Patent
Amaya et al.

(10) Patent No.: US 11,781,229 B2
(45) Date of Patent: Oct. 10, 2023

(54) HYDROGEN PRODUCTION FROM GEOTHERMAL RESOURCES USING CLOSED-LOOP SYSTEMS

(71) Applicant: GreenFire Energy Inc., Emeryville, CA (US)

(72) Inventors: Alvaro J. Amaya, Emeryville, CA (US); Joseph A. Scherer, Emeryville, CA (US)

(73) Assignee: GreenFire Energy Inc., Emeryville, CA (US)

( * ) Notice: Subject to any disclaimer, the term of this patent is extended or adjusted under 35 U.S.C. 154(b) by 0 days.

(21) Appl. No.: 17/319,999

(22) Filed: May 13, 2021

(65) Prior Publication Data
US 2021/0371990 A1   Dec. 2, 2021

Related U.S. Application Data

(60) Provisional application No. 63/023,894, filed on May 13, 2020.

(51) Int. Cl.
*C25B 1/50* (2021.01)
*C25B 1/042* (2021.01)
(Continued)

(52) U.S. Cl.
CPC ................ *C25B 1/50* (2021.01); *C25B 1/042* (2021.01); *C25B 9/19* (2021.01); *C25B 9/67* (2021.01); *C25B 15/02* (2013.01); *F03G 4/00* (2021.08)

(58) Field of Classification Search
CPC .. C25B 1/50; C25B 1/042; C25B 9/19; C25B 9/67; C25B 15/02; C25B 1/02;
(Continued)

(56) References Cited

U.S. PATENT DOCUMENTS

| | | | |
|---|---|---|---|
| 4,284,900 A | 8/1981 | Botts | |
| 5,202,194 A * | 4/1993 | VanBerg, Jr. | ........... H01M 8/00 429/513 |

(Continued)

FOREIGN PATENT DOCUMENTS

| | | |
|---|---|---|
| JP | H11508342 A | 7/1999 |
| JP | 2019513211 A | 5/2019 |

(Continued)

OTHER PUBLICATIONS

Yilmaz, Ceyhun "Thermoeconomic modeling and optimization of a hydrogenproduction system using geothermal energy" Geothermics vol. 65, Jan. 2017, pp. 32-43 (10 pages).

(Continued)

*Primary Examiner* — Hoang M Nguyen
(74) *Attorney, Agent, or Firm* — Osha Bergman Watanabe & Burton LLP

(57) ABSTRACT

Described are methods and systems for producing hydrogen using closed-loop geothermal technology from geothermal, oil and gas or other resources. Various configurations and types of closed-loop systems are described which enable the capture, transfer and use of heat from the resource and from chemical reactions from the processes and methods employed and to also create high down bore pressure, in each case to enhance the technical and commercial efficiency of various hydrogen production methods. As hydrogen is created at high pressures and purities which are necessary for delivery and commercial use of hydrogen, the need for additional compression and purification activities is minimized. Various of the methods and systems described can make hydrogen produced from fossil fuel inputs less carbon intensive and make renewable fuel inputs produce hydrogen entirely without carbon outputs, thereby contributing substantially to the reduction of greenhouse gasses.

9 Claims, 19 Drawing Sheets

(51) Int. Cl.
*C25B 9/67* (2021.01)
*C25B 9/19* (2021.01)
*F03G 4/00* (2006.01)
*C25B 15/02* (2021.01)

(58) Field of Classification Search
CPC .... C25B 1/26; C25B 9/00; F03G 4/00; C01B 2203/1241; C01B 2203/80; C01B 3/068; C01B 3/36; C01B 3/382; Y02E 60/36; Y02P 20/129
USPC .............................................. 60/641.2–641.4
See application file for complete search history.

(56) References Cited

U.S. PATENT DOCUMENTS

| | | | | |
|---|---|---|---|---|
| 5,661,977 | A * | 9/1997 | Shnell | F03G 7/04 |
| | | | | 60/659 |
| 5,697,218 | A | 12/1997 | Shnell | |
| 8,169,101 | B2 * | 5/2012 | Hinders | F28F 3/046 |
| | | | | 60/641.2 |
| 8,549,857 | B2 * | 10/2013 | Papile | B01D 53/08 |
| | | | | 60/645 |
| 2007/0220887 | A1 | 9/2007 | Monostory et al. | |
| 2008/0148733 | A1 | 6/2008 | Fein et al. | |
| 2008/0149302 | A1 | 6/2008 | Fein et al. | |
| 2014/0308592 | A1 * | 10/2014 | Maki | H01M 4/9041 |
| | | | | 429/405 |
| 2016/0176794 | A1 * | 6/2016 | Su | B01J 35/1038 |
| | | | | 502/313 |
| 2021/0156039 | A1 * | 5/2021 | Ballantine | C25B 9/00 |

FOREIGN PATENT DOCUMENTS

| | | |
|---|---|---|
| WO | 96/23181 A1 | 8/1996 |
| WO | 2004/033759 A2 | 4/2004 |
| WO | 2009004439 A2 | 1/2009 |

OTHER PUBLICATIONS

J. Shnell et al., "Supercritical Geothermal Cogneration: Combining Leading-Edge, Highly-Efficient Energy and Materials Techonologies in a Load-Followining Renewable Power Generation Facility", GRC Transactions, 2018, vol. 42 (12 pages).
Office Action in corresponding Japanese Patent Application No. 2021-081896, dated Aug. 30, 2022 (14 pages).
Partial European Search Report issued in Application No. 21173513.9, dated Oct. 15, 2021 (15 pages).
Office Action in corresponding Japanese Patent Application No. 2021-081896, dated May 16, 2023 (22 pages).

* cited by examiner

HYDROGEN PRODUCTION FROM GEOTHERMAL RESOURCES USING CLOSED-LOOP SYSTEMS

FIELD OF THE DISCLOSURE

The present invention relates generally to apparatus, systems, processes, and methods for producing hydrogen from geothermal resources using closed-loop systems. More specifically, the present invention relates to apparatus, systems, process and methods for harvesting geothermal energy from various types of wells using multiple systems, processes and methods to efficiently and cost-effectively produce hydrogen with reduced or no carbon emissions using a variety of fuels and methods.

BACKGROUND

As concerns about climate change are increasing and the contributions of greenhouse gases become more apparent, more emphasis has been placed on the further development of systems to produce hydrogen to act as a carbon free fuel. Power from solar and wind is intermittent and poses problems for the electrical grid, which require expensive storage solutions to address. An advantage of hydrogen, supported by appropriate storage technologies, is that it can be used for domestic consumption as it can be safely transported by a variety of means and stored in a variety of forms as well itself used to produce power. Hydrogen is already used for many purposes but the large scale, cost-effective production of hydrogen will allow hydrogen to supplant fossil fuels for transportation, power generation and heating without contributing carbon gases.

Not only is hydrogen the only known fuel that is carbon-free, it possesses high-energy content. It can be used as fuel for direct combustion in an internal combustion engine or in a fuel cell, producing only water as a byproduct. As such, hydrogen is globally accepted as an environmentally benign secondary form of renewable energy.

However, unlike fossil fuels, hydrogen is not readily available in nature. A wide variety of processes are available for hydrogen production that, according to the raw materials used, can be divided into two major categories, namely, conventional, and renewable technologies. The first category processes fossil fuels and includes hydrocarbon pyrolysis and the hydrocarbon reforming techniques of steam reforming, partial oxidation and autothermal reforming.

The second category includes the methods which produce hydrogen from renewable resources, either from biomass or water. Utilizing biomass as feedstock, these methods can be further divided into two general subcategories: thermochemical and biological processes. Thermochemical methods can be further divided into pyrolysis, gasification, combustion, and liquefaction. Methods using water as feedstock are characterized by the water splitting techniques of electrolysis, thermolysis and photo-electrolysis.

All methods of hydrogen production at commercial levels require substantial energy, which has typically been provided by burning fossil fuels. Hence, when geothermal energy is used to make hydrogen from renewable feedstock, the prospect of using geothermal energy for hydrogen production is doubly attractive as the use of fossil fuels is avoided both as the fuel and as the energy source. Further, where the hydrogen production method uses water as a feedstock, geothermal energy can be used to avoid the emission of carbon gasses. The fact that the earth contains an effectively unlimited amount of heat that can be accessed with closed-loop geothermal systems and that energy can be produced on a continuous, reliable, and environmentally friendly basis holds great promise for producing vast amounts of energy without using fossil fuels or emitting greenhouse gases.

Of course, geothermal energy is often harnessed for the production of electricity and that electricity can be used to produce hydrogen using electrolysis. However, this two-step process is typically inefficient and uneconomic.

Bringing heat from a geothermal resource to the surface to provide thermal energy to heat water and thereby assist in making hydrogen via electrolysis and other methods with surface systems has also been considered. In conventional geothermal systems with conventional geothermal technology, fractures in the earth containing geothermal brine and/or steam must be discovered or created and such brine and/or steam must be kept flowing in those fractures. Also, using conventional geothermal systems such brine and/or steam will expand in their rise to the surface losing temperature due to expansion and there is commonly additional heat loss to the surrounding overburden rock as the brine and/or steam approaches the surface. Similarly, in conventional geothermal systems with conventional geothermal technology, as geothermal brine and/or steam in a conventional geothermal well expands in its rise to the surface, it loses pressure. Each of these factors negatively impacts use of geothermal energy for the production of hydrogen.

SUMMARY OF THE DISCLOSURE

In one aspect, embodiments disclosed herein relate to a system for using geothermal resources by means of a well installed in the geothermal resource with an apparatus to create a closed loop for the circulation of a working fluid through the closed loop to capture heat and create pressure to enhance various methods of producing hydrogen. The system may be disposed in a number of well configurations with apparatus appropriate to the well configuration and various hydrogen production methods.

In some embodiments, the closed-loop system will be disposed in a well in a coaxial fashion and used to enhance the production of hydrogen down bore by various chemical and water splitting methods using heat from the geothermal resource and high pressure arising from the column of water penetrating deep in the well, thermal expansion and otherwise.

In some embodiments, the closed-loop system will be disposed in a well in a coaxial fashion down bore and used to enhance the production of hydrogen using the alkaline electrolysis method (AE Down Bore Method), which may or may not include the use of zero gap electrolysis cells. In the AE Down Bore Method water is introduced at the cathode where it is split into hydrogen which is separated from water in a separation unit and hydroxide ions ($OH^-$) which in turn travel through the aqueous electrolyte to the anode in order to form oxygen ($O_2$).

In some embodiments, the closed-loop system will be disposed in a well in coaxial fashion down bore and is used to enhance the production of hydrogen using the solid oxide electrolysis cell method (SOEC Down Bore Method). In the SOEC Down Bore Method preheated steam is introduced at the cathode where it is split into hydrogen and oxygen ($O_2$) using a solid electrolyte. The energy supplied to produce the hydrogen in some of the systems and processes described is supplied by geothermal energy and integrated with heat from other sources causing a higher reaction temperature that decreases electricity requirements.

In some embodiments, the closed-loop system will be disposed in a well in a coaxial fashion and used to enhance the production of hydrogen using the proton exchange membrane method (PEM Down Bore Method). In the PEM Down Bore Method water for electrolysis is introduced at the anode where it is split into protons (hydrogen ions, $H^+$) which in turn travel through a membrane to the cathode in order to form hydrogen ($H_2$) and oxygen ($O_2$).

In some embodiments, the closed-loop system will be disposed in a well in a coaxial fashion and used to enhance the production of hydrogen using the AE Down Bore Method, the SOEC Down Bore Method or the PEM Down Bore Method as described above but using water in supercritical phase. In these embodiments, water of sufficient temperature at the surface will flow through the closed-loop system and increase in pressure and, potentially in very hot geothermal resources, increase in temperature to reach a supercritical state. By using water in supercritical phase the electrical energy required to electrolyze water is much reduced, thereby enhancing the overall efficiencies of electrolysis.

In some embodiments, the closed-loop system will be in a U-shape configuration formed by the underground connection of two vertical wells deep in the geothermal resource whereby the fluid transporting heat and under pressure flows through a U-shape well in a continuous process but at flow rates where all the fluid is converted to gas products (hydrogen and oxygen). The water is not recirculated to the surface, in each case enhancing the production of hydrogen using the AE Down Bore Method, the SOEC Down Bore Method and the PEM Down Bore Method.

In some embodiments, the closed-loop system will be in a U-shape configuration formed by the underground connection of two vertical wells deep in the geothermal resource whereby the fluid transporting heat and under pressure flows through a U-shape well in a continuous process delivering high temperature and high pressure water, which may or may not achieve supercritical phase, to a processing unit, which may be down bore or at the surface at the output of the U-Loop, to enhance the production of hydrogen using the AE Down Bore Method, the SOEC Down Bore Method or the PEM Down Bore Method. In such embodiments flow rates are controlled to maximize the hydrogen production and recirculation of the unconverted water and/or electrolyte is allowed, controlled and optimized.

In some embodiments the apparatus and methods described are designed to supply and optimize its endothermic requirements providing by heat from geothermal source and electricity from coproduction, but in other embodiments, the apparatus and methods described combine parallel endothermic and exothermic reactions with components that optimize the surface area of contact permitting optimal heat transference of both mechanisms to harness exothermic hydrogen production methods to satisfy the endothermic hydrogen production requirements. This is in addition to using the geothermal reservoir as a heat source to increase the base line temperature and pressure of the system thereby reducing the energetic requirements of different hydrogen production methods and increasing the global efficiency of the system.

In some embodiments, two closed-loop systems will be disposed in a well down bore in a coaxial fashion and used to enhance the production of hydrogen using the copper chloride method (CuCl Down Bore Method) in combination with the partial oxidation method (POX Down Bore Method). The copper chloride method is a thermochemical cycle involving a series of chemical reactions at different temperatures and constitutes one of the most promising processes by which heat is converted into chemical energy to produce hydrogen. In some embodiments, the closed-loops themselves are coupled to act as chemical reaction chambers such that excess heat from the exothermic POX Down Bore Method is used in the endothermic CuCl Down Bore Method, in each case producing hydrogen.

In some embodiments, the wells in which the closed-loop system will be deposed will be a new, purpose-drilled wells in a coaxial fashion. In other embodiments, an existing geothermal or oil and gas well will be retrofit with the closed-loop system in a coaxial fashion. Where hydrocarbons are used as fuel or as energy inputs for the hydrogen production process such as in the POX Down Bore Method the hydrocarbons may be extracted from the retrofit oil and gas well or another productive oil and gas well. If this system is installed in a geothermal well, the hydrocarbon fuel may be imported.

In another aspect, embodiments herein may include transporting produced fluids in the system using surface or submerged pumps, through a thermosiphon effect, or a combination thereof.

In another aspect, embodiments herein relate to a process for producing or coproducing geothermal brine as working fluid and generating thermal or electrical power at the surface which can be used in the various hydrogen production methods referenced above, whether such methods are performed at the surface or down bore in the closed-loop system disposed in a well. The process may include disposing a heat exchanger within the production conduit comprised of a lined well or hole open to the reservoir, the heat exchanger comprising an outer heat exchange conduit and an inner conduit. A working fluid may be circulated through the outer heat exchange conduit and into the inner conduit or vice versa. In some embodiments where the well is capable of producing steam or liquid brine from the annulus formed by the wellbore or well casing on the outside and the heat exchanger on the inside, such brine will may be produced to the surface and used to produce electrical energy which in turn can be used in the various electrolysis methods referenced above. In some embodiments, such produced brine may be used to deliver thermal energy to preheat the water or other fluids used in the hydrogen production methods referenced above.

Other aspects and advantages will be apparent from the following description and the appended claims.

DETAILED DESCRIPTION

Figure 1:
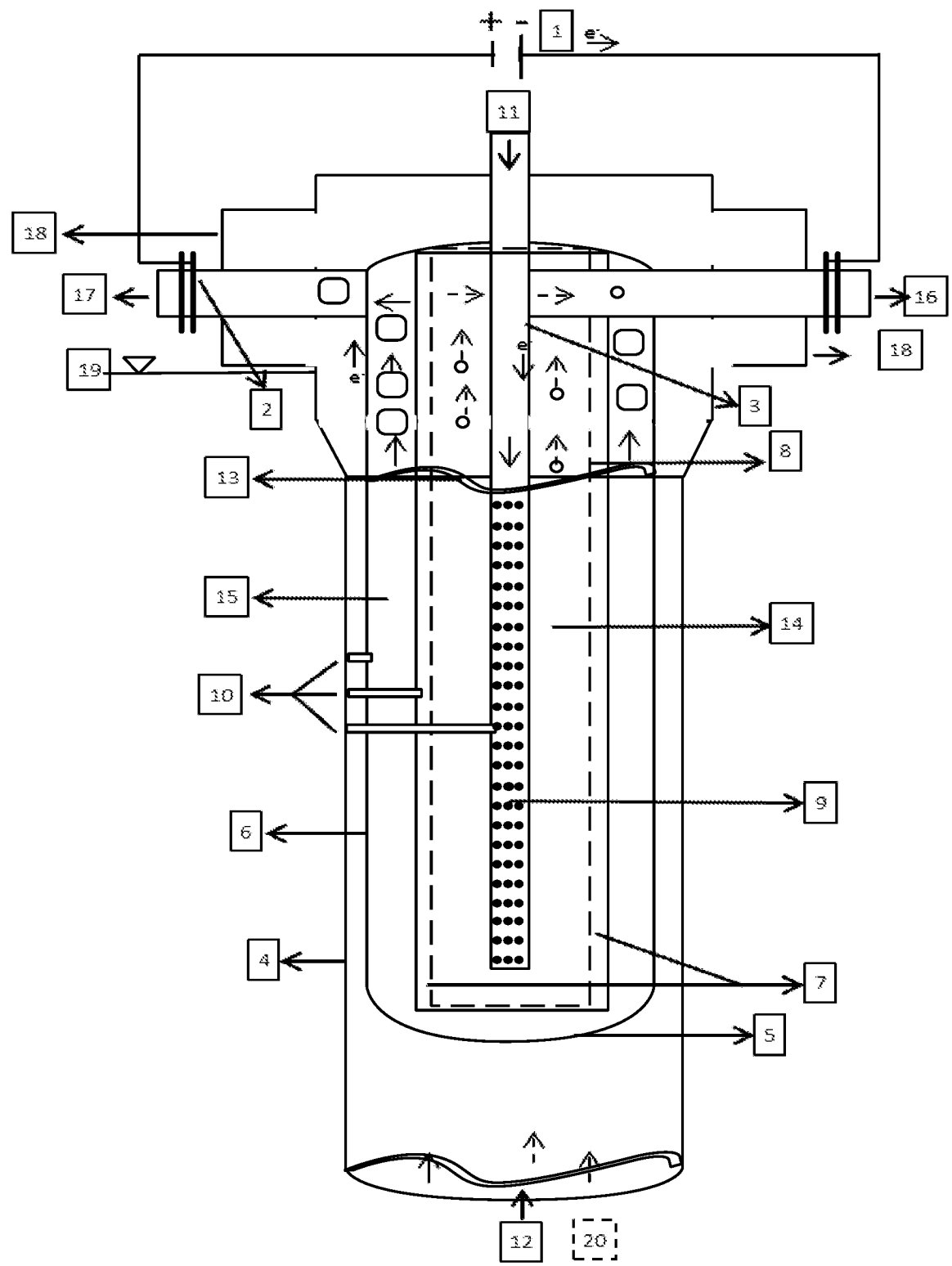
FIG. 1 is an illustration of a coaxial down bore closed-loop system for use in producing hydrogen with the AE Down Bore Method according to embodiments herein.

As outlined above, various methods of producing hydrogen exist, but all methods of hydrogen production require very substantial energy which is provided by thermal energy, electrical energy or both. In addition, many hydrogen production methods require less energy and are more efficient when done at high temperature and pressure.

Embodiments herein are directed toward closed-loop geothermal systems in which hydrogen production may be performed downhole. Down bore processes to produce hydrogen may take advantage of and optimize the higher heat and pressure conditions available down bore. For example, collection of brine and/or steam to capture thermal energy and produce hydrogen down bore may avoid the heat and pressure losses associated with conventional geothermal systems. Systems and processes herein may also achieve high temperatures and may avoid the need for externally supplied electricity. Further, embodiments here may capture, store, and recycle heat from exothermic production methods and then use such heat to simultaneously or in stages power an endothermic hydrogen production method. One or more of these and other advantages may be realized by the systems and processes herein and described further below.

Closed-loop geothermal systems employ wells drilled deep into the geothermal resource that can capture thermal energy and can create and maintain high levels of hydrostatic pressure from the column of water in the closed-loop or from pumps. Further, a closed loop-system disposed in a geothermal resource can produce heated fluids at precisely controlled pressures and temperatures to the surface to create electrical energy necessary for many hydrogen production methods on the surface. Harnessing these key features of closed-loop geothermal systems can enhance down bore hydrogen production compared to conventional hydrogen production methods. Where hydrogen is made from non-carbon based renewable feedstock (e.g. water), the prospect of using geothermal energy for hydrogen production is even more attractive as carbon is avoided as the fuel, as the source of reactive energy and as an output of hydrogen production.

Similarly, closed-loop geothermal systems have the advantage of allowing the circulation of fluids that can absorb heat from the resource whether or not fractures, permeability and water exist in the resource and, if so, whether water can circulate for long periods of time to deliver heat to the circulated fluid. In contrast, closed-loop geothermal systems can operate in hot dry rock and be long-lived despite a variety of resource conditions that would limit conventional hydrothermal systems.

In a geothermal reservoir, the hot fluids are generally under tremendous pressure, the source of this pressure being the rock overburden (lithostatic pressure), the water table (hydrostatic pressure), or some combination of the two. As geothermal fluid comprised of steam and/or brine is produced from a geothermal reservoir via a well, it undergoes a reduction in pressure. Indeed, this pressure difference is what propels the geothermal steam or brine to the surface. Depending on the pressure and the enthalpy of the steam or brine, it may expand or flash to a vapor as it rises up the well. While this does not adversely affect the enthalpy of the produced fluid, it does result in a decreased temperature of the produced mixture of steam and brine.

By inserting a down bore closed-loop system into a producing geothermal well, higher geothermal steam and brine temperatures at depth can be accessed. Even where the well does not naturally produce steam and brine to the surface, the high heat in the resource at depth can be transferred to fluids in the closed-loop system as the fluid circulates in the closed loop. This allows the fluid circulating in the closed-loop system to gain all or a portion of the thermal energy needed to be able to produce hydrogen by various methods more efficiently and with improvements in the kinetic reactions and flows than if geothermal heat was produced to the surface and transferred to a surface system to provide thermal energy for hydrogen production.

Inserting a down bore closed-loop system into a geothermal resource and circulating a fluid in the closed-loop system will create high pressure in the fluid toward the bottom of the closed-loop due to the hydrostatic pressure of the column of fluid above. This allows the fluid circulating in the closed-loop system to have the high pressure needed to be able to produce hydrogen by various methods more efficiently and with improvements in the kinetic reactions, avoiding the need to use additional energy to compress fluids that would be necessary to reach similar pressures in a conventional hydrogen production system on the surface. Further, the hydrogen delivered to the surface from the closed-loop system can remain at high pressure, thereby reducing the need for additional energy required to compress hydrogen for transportation or other commercial purposes. As this high pressure feature of a closed-loop system is independent of the geothermal resource, high pressure can be created in geothermal wells irrespective of whether the well produces any steam or brine. As a consequence, a closed-loop system can provide high temperature and pressure to support the production of hydrogen from unproductive geothermal or oil and gas wells or from the hot, dry rock geothermal resources that comprise the vast bulk of geothermal resources in the world.

Electrolysis is used in various hydrogen production methods to make a very pure hydrogen that requires little no additional purification steps and such methods are typically much more efficient at high temperatures. The electrolysis systems described herein have the advantage that they can produce electrical energy for electrolysis in addition to the thermal energy to achieve such high temperatures, thereby avoiding in whole or part the need for externally supplied electricity for hydrogen purification.

While most hydrogen production methods are endothermic, some methods, described herein such as partial oxidation, are exothermic. An advantage of the systems and methods described herein is that a single system can capture, store, and recycle heat from the exothermic production methods and then use such heat to simultaneously or in stages power endothermic hydrogen production methods.

In some embodiments, the closed-loop system will be disposed in a well in a coaxial fashion and to enhance various chemical and electrolysis hydrogen production methods employed down bore by using heat from the geothermal resource and pressure from the column of fluid, thermal expansion and potential additional pressure from pumping or a thermosiphon effect. FIGS. 1, 3, 5, 7, 16 and 18 show such a coaxial disposition of the closed-loop system for use in hydrogen production in various methods. Installation of closed-loop systems in wells is relatively straight forward and has been demonstrated by GreenFire Energy Inc. at its demonstration project using a geothermal well at Coso, Calif. Purpose-drilled wells can be used which are tailored to the resource and surface conditions most appropriate for techno-economic optimization of the overall system. However, most geothermal wells and many oil and gas wells can be repurposed for hydrogen production by inserting a closed-loop system as proposed herein and selecting a hydrogen production method from the following methods that are best suited to the geothermal resource, well history, well specifications, and existing surface power and infrastructure. Many such repurposed wells may be entirely unproductive or marginally productive for their original purpose but can be retrofit with a closed-loop hydrogen production system at very low cost given that the well has already been drilled and cased and that the characteristics and history of the well and the surrounding geothermal resource are well known and easily verified.

In all the embodiments represented in the figures where an electrolysis process occurs, the voltage differential injects an electrical current from the charge supply 1, electrons travel through the current supply cathode 3, through the electrolyte and to the anode 2. The well casing 4 was installed after drilling the borehole. Geothermal brine and steam 12 from the geothermal reservoir may be present and, if so, ascend in the annulus between the well casing and the closed-loop casing 5 to provide heat to the closed loop and transport heat from the bottom of the well to the surface where it can be used to coproduce electricity. Where geothermal brine and steam are not present in the resource, the well casing 5 and closed-loop casing 7 may be the same and heat from the rock may be transferred to the closed-loop directly. Non-conductive centralizers 10 support the coaxial tube components in some of the embodiments to ensure separation of the electrodes and other electrical conductive components. In some embodiments an electronic submergible pump (ESP) 20 may be added were appropriate to assist in returning fluid and gases to the surface while retaining down bore pressures. The surface level is represented by 19. In the interior of the specific embodiments different components, configurations, processes, and methods may be used to provide optimal results depending on different borehole and other conditions.

In some embodiments, the closed-loop system will be disposed in a well in a coaxial fashion and used to enhance the production of hydrogen using the alkaline electrolysis method (AE Down Bore Method). In some such embodiments, the AE Down Bore Method will include the apparatus and system of using zero gap alkaline electrolysis cells down bore wherein the alkaline electrolyte water is electrolyzed and therein divided into the hydrogen and oxygen product streams.

As shown in FIG. 1, water and an alkaline electrolyte are introduced in a perforated pipe 9 extending down bore and connected at the surface to the electrolyte solution supply 11. FIG. 1 also shows the process electrons moving from the cathode 3 to the anode 2 via electrical connections with perforated pipe 9 and casing 7 (e.g., perforated pipe 9 acts as the cathode, and casing 7 the anode 6). In between the electrodes the water containing the electrolyte solution 11 is split for the formation of hydrogen 14 and oxygen 15. Electrolyte solution passes through another perforated pipe 7 that supports and lines a gas separator membrane 8. This membrane is permeable to the electrolyte, the hydroxide ions (OH$^-$) can travel through the aqueous electrolyte where is oxidized to form oxygen ($O_2$) and the proton is reduced gaining an electron and forming hydrogen ($H_2$). However, this membrane is impermeable to gases (hydrogen and oxygen) that are created and formed in opposite electrostatic directions or different axial sides. The input flow rate of the electrolyte solution 11 is also controlled to be equal to the products flow rate formation, the water level 13 is kept constant and at the optimal level of the system conversion, and the gases are transported to the surface due to gravitational and vacuum guidance forces. Hydrogen ($H_2(g)$) 16 and oxygen ($O_2(g)$) 17 are collected in specific streams at the surface. High efficiency of conversion is expected because of the high surface area of contact of the electrodes and the electrolyte along the long borehole closed-loop system. Geothermal fluids may also be collected at surface 18 for electrical power production using conventional systems to restart the electrolysis loop at 1, for electrolyte makeup or for reinjection into the geothermal resource.

Figure 2:
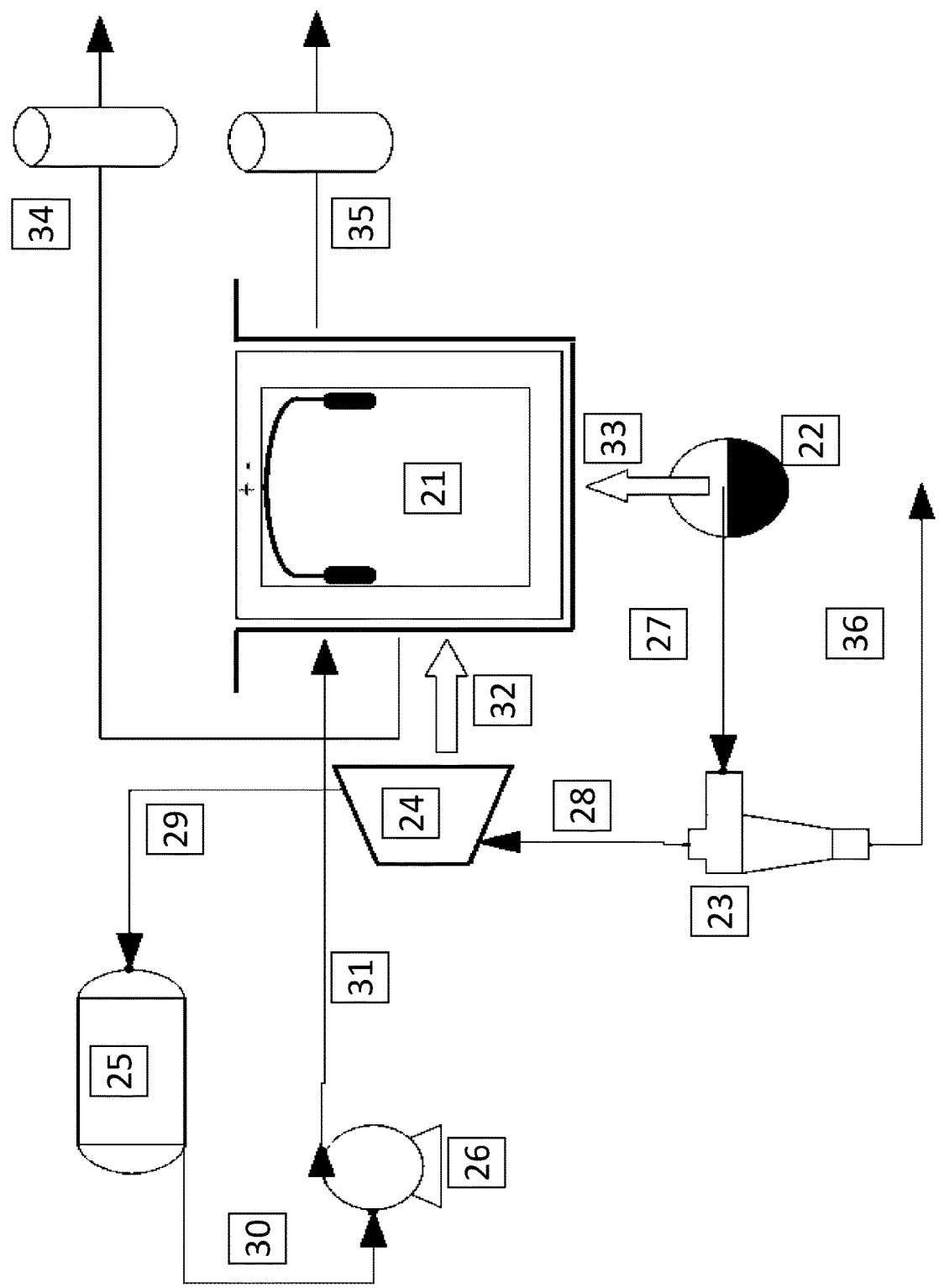
FIG. 2 is a process flow diagram of a closed-loop geothermal system for producing hydrogen with the AE Down Bore Method according to embodiments herein.

FIG. 2 shows a process flow diagram for the AE Down Bore Method. The down bore electrolysis system 21 is heated by a well 22, the coproduced geothermal brine and steam is separated in the cyclonic separator 23, and it is sent to a turbine 24 where electricity is produced that in part supplies to the down bore electrolyzer 21. From the turbine 24 fluid is sent to a condenser 25 and later a pump 26 to transport the thermally exhausted and condensed water recirculation as electrolyte 21 and close the loop. The streams in FIG. 2 show the coproduction flow 27, the steam separated from the geothermal system 28, the thermally exhausted water 28, the condensed water 30, and the pumped water requirement 31. The turbine 24 supplies the electricity 32, and the well 22 supplies the heat stream 33. The products of the cycle are shown in the stream of hydrogen 34 and steam of oxygen 35 respectively. And the brine 36 separated from cyclonic separator is available to restart the electrolysis loop or reinjected into the geothermal resource.

Figure 3:
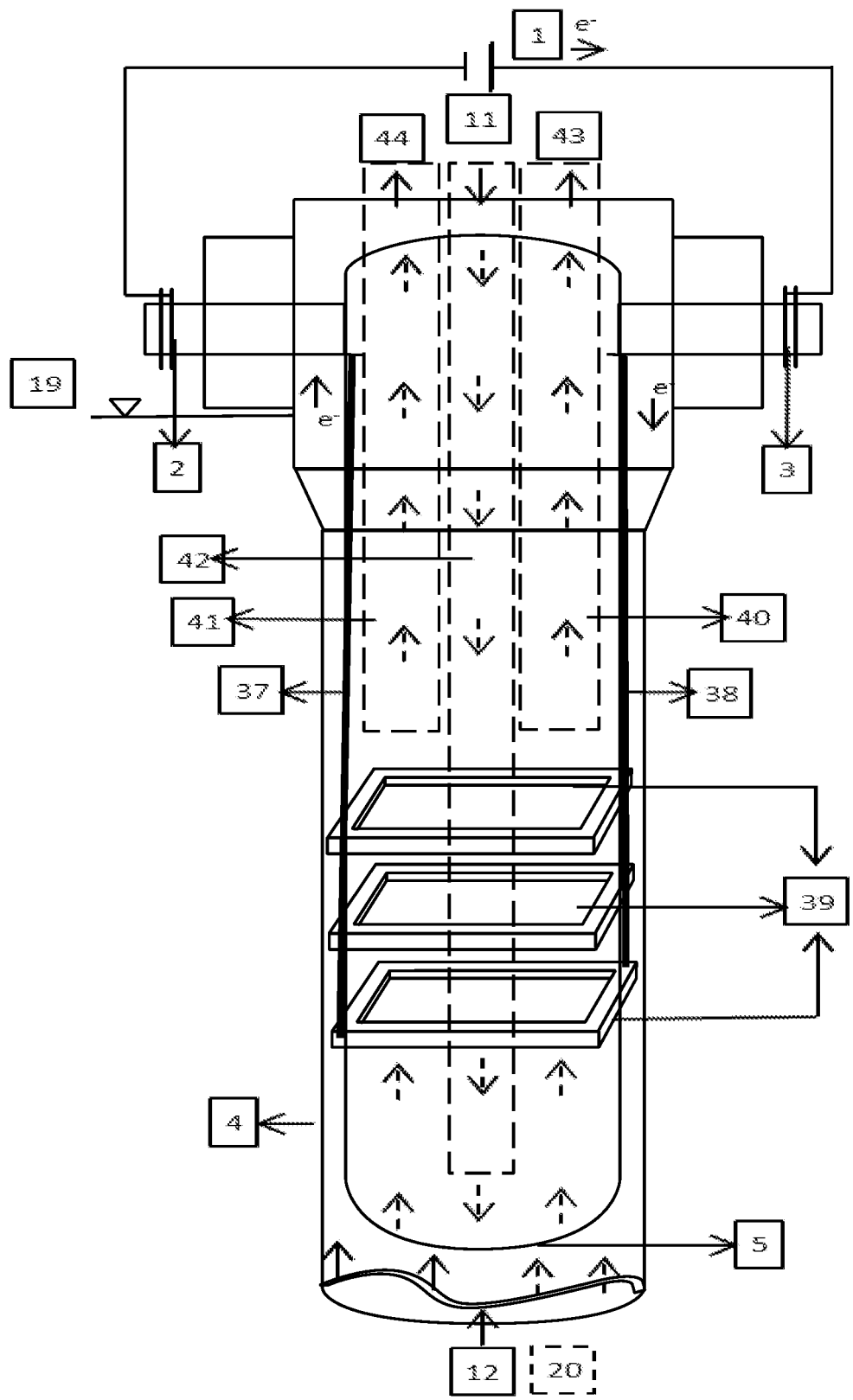
FIG. 3 is an illustration of a coaxial down bore closed-loop system for use in producing hydrogen with the AE Down Bore Method using a zero gap cell according to embodiments herein.
Figure 4:
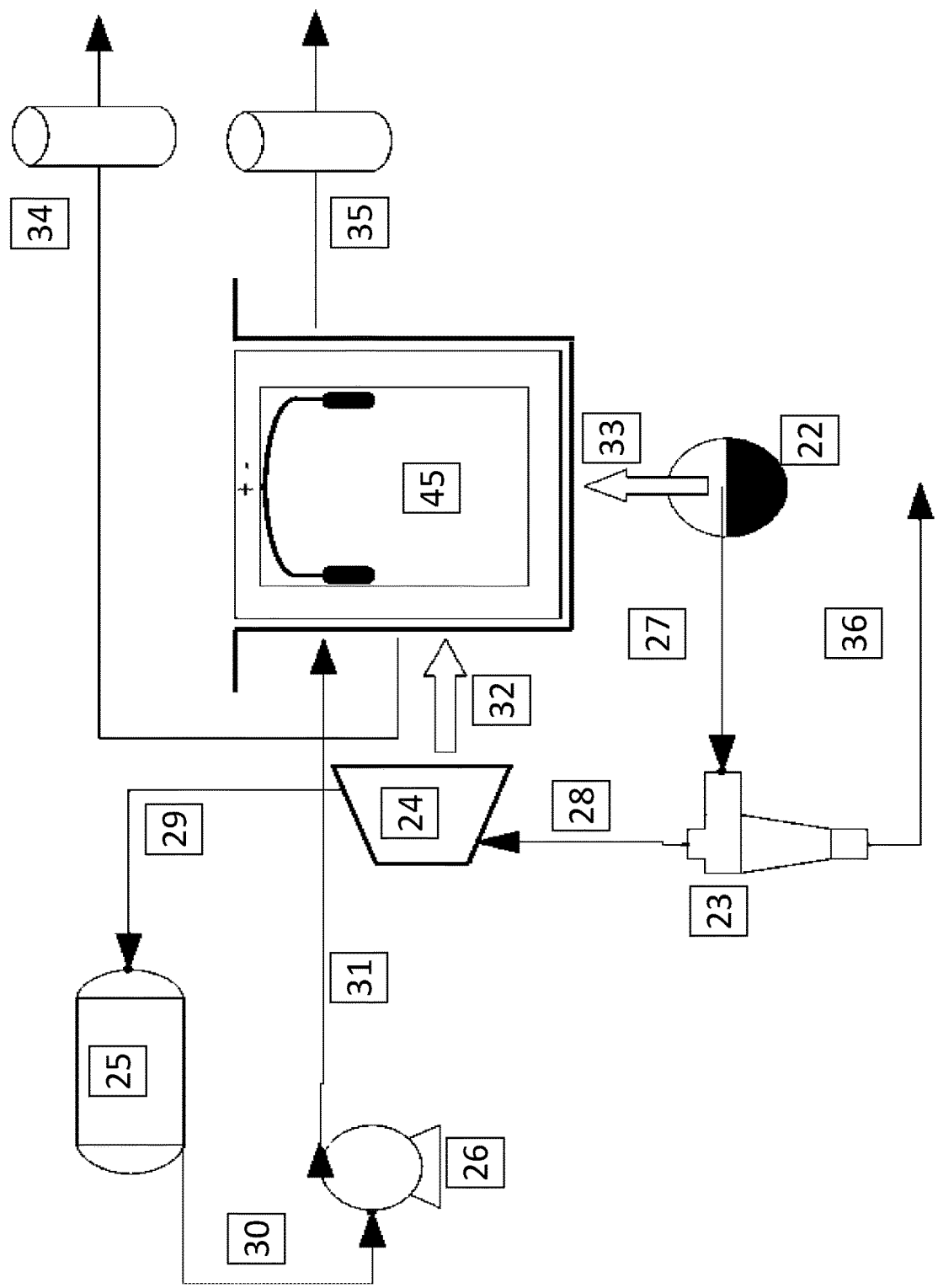
FIG. 4 is a process flow diagram of a closed-loop geothermal system for producing hydrogen with the AE Down Bore Method using a zero gap cell according to embodiments herein.

In another embodiment system shown in FIG. 3, the AE Down Bore Method includes electrolysis with zero gap cells 39, which may be used to decrease the overall resistance to the electrolysis reaction. Some of the general components were already described with respect to FIG. 1, but some others change due to the different electrolysis components configuration, particularly the cathode 3 and anode 38 which are connected in the transverse zero gap cells. In this configuration the electrolyte and water 11 is introduced at the surface and is transported through tube 42 to the bottom of the closed loop casing 5. The ascending fluid is forced to pass through the zero gap cells and each cell internally separates hydrogen and oxygen into separate tubes 40 and 41 to deliver the hydrogen and oxygen outputs 43 and 44 at the surface respectively. FIG. 4 shows a process flow diagram for the zero gap cell AE Down Bore Method. This is the same as the FIG. 2 process flow diagram, but the zero gap down bore electrolysis system 45 is substituted for the down bore electrolysis system 21.

Figure 5:
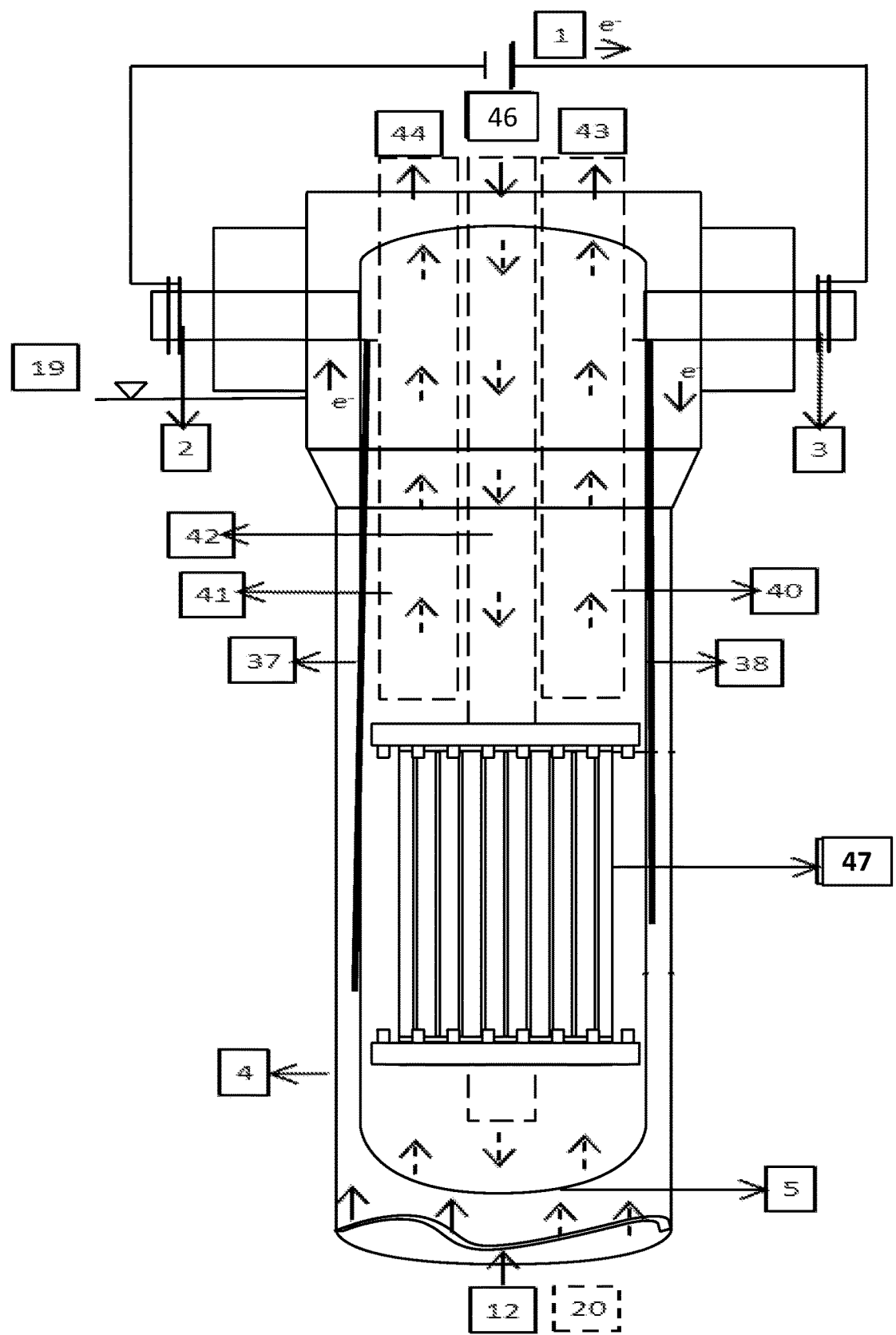
FIG. 5 is an illustration of a coaxial down bore closed-loop system for use in producing hydrogen with the SOEC Down Bore Method according to embodiments herein.
Figure 6:
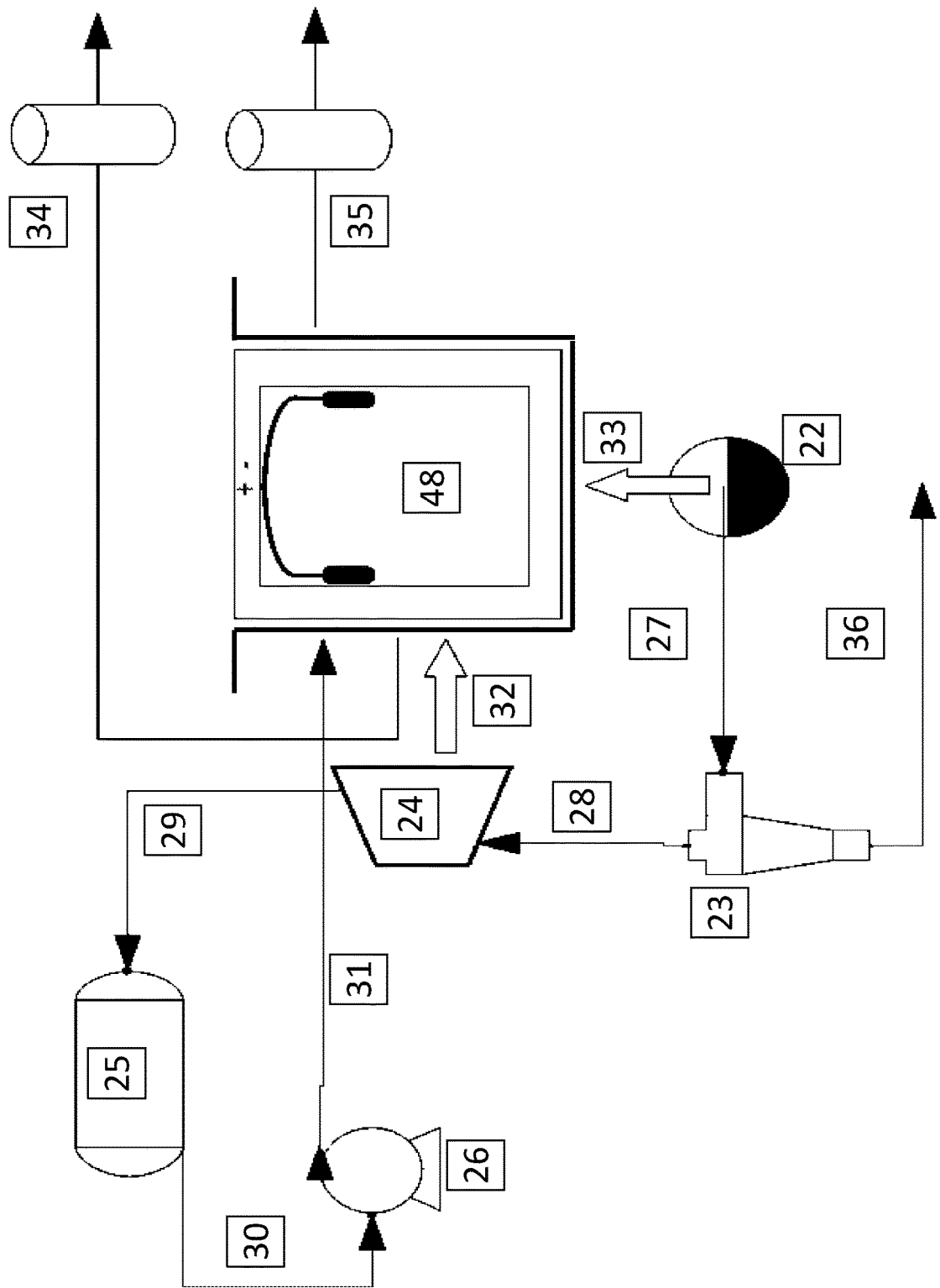
FIG. 6 is a process flow diagram of a closed-loop geothermal system for producing hydrogen with the SOEC Down Bore Method according to embodiments herein.

In some embodiments, the closed-loop system will be disposed down bore in a well in coaxial fashion and is used to enhance the production of hydrogen using the solid oxide electrolysis cell method (SOEC Down Bore Method). As shown in FIG. 5, electricity from the charge supply 1 is supplied to the cathode 38 of the solid oxide electrolyte cell 47. Fluid 46 is introduced at the pipe 42 to the bottom of the closed-loop system where its temperature and pressure are increased and ascends to the solid oxide electrolyte cell 47 where it is split into hydrogen and oxygen which, in turn, is separated from water in a separation units 40 and 41 respectively and delivered to the surface in their respective output conduits 43 and 44. FIG. 6 shows a process flow diagram for the SOEC Down Bore Method which is the same as FIG. 2 process flow diagram except the solid oxide electrolyte cell 47 is substituted for the down bore electrolysis system 21.

Figure 7:
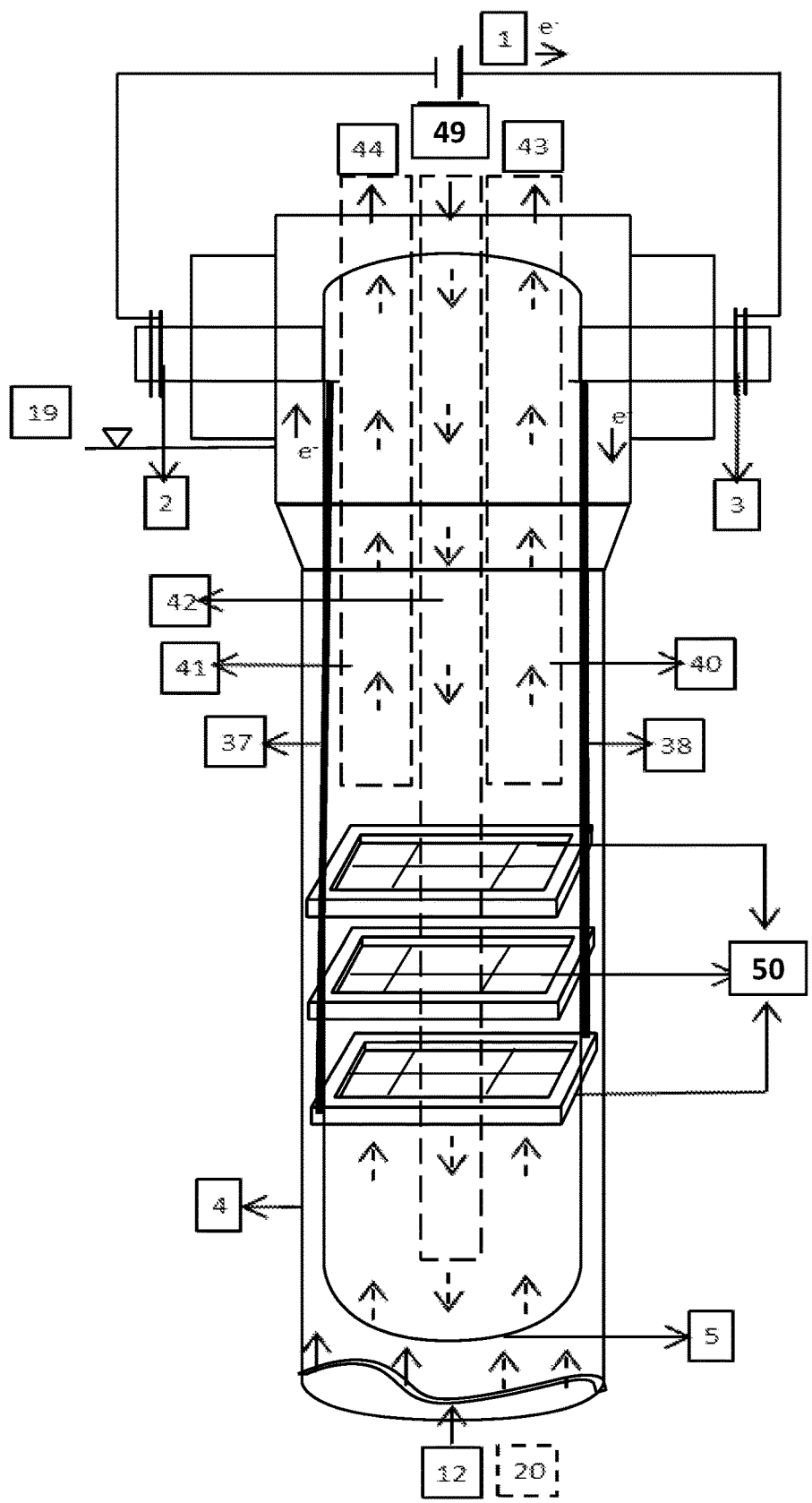
FIG. 7 is an illustration of a coaxial down bore closed-loop system for use in producing hydrogen with the PEM Down Bore Method according to embodiments herein.
Figure 8:
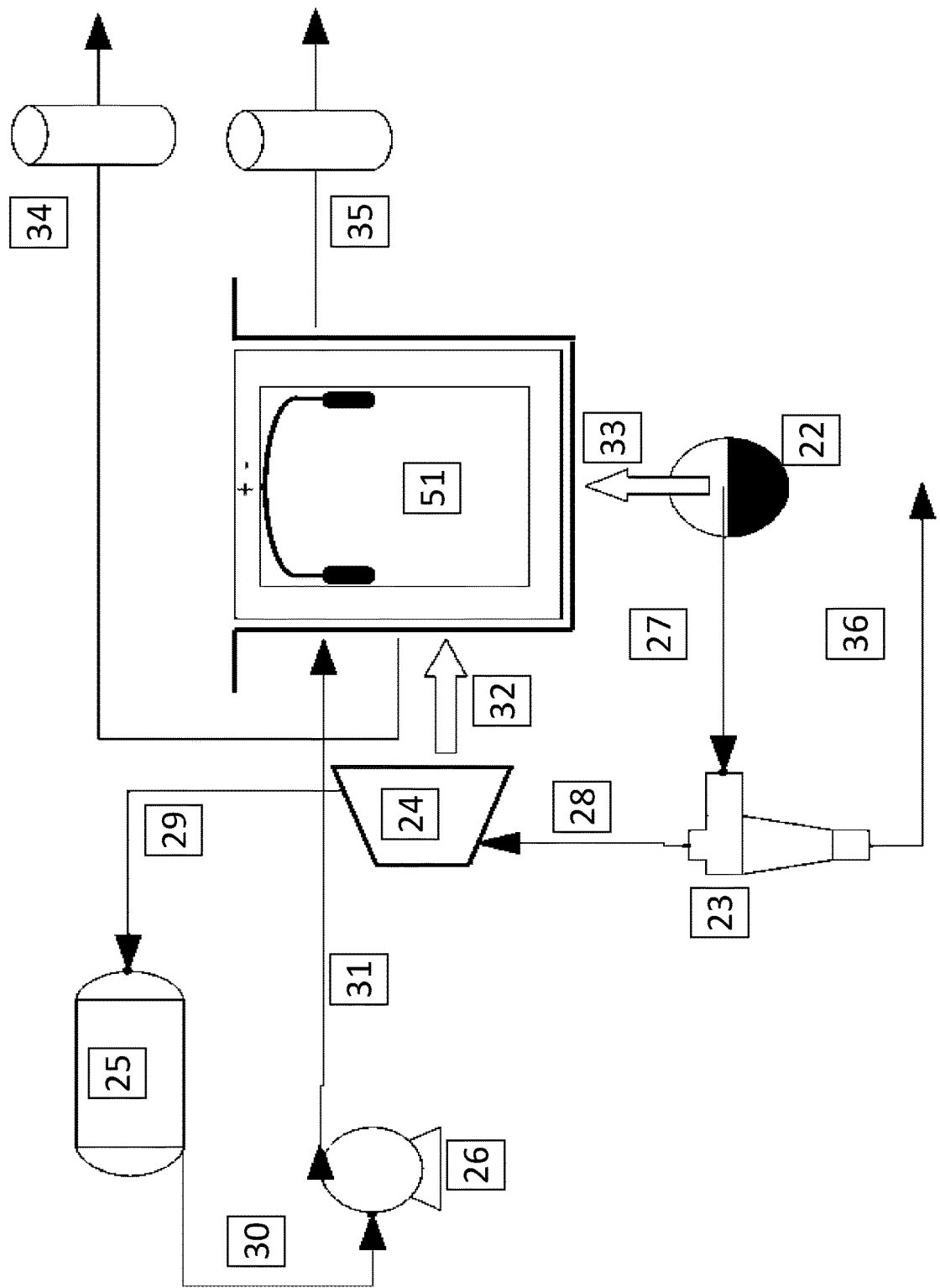
FIG. 8 is a process flow diagram of a closed-loop geothermal system for producing hydrogen with the PEM Method according to embodiments herein.

In some embodiments, the closed-loop system will be disposed in a well in coaxial fashion and is used to enhance the production of hydrogen using the proton exchange membrane method (PEM Down Bore Method). As shown in FIG. 7, a stream of water as liquid or steam 49 is introduced into the pipe 42 and descends to the bottom of the closed-loop system where the desired temperature and pressure is increased due to the geothermal gradient, water column, and/or pump support. Polymer electrolyte membrane cells are disposed in series and transverse to the ascending flow direction. Electricity is supplied from the charge point 1 to the cathode 3 and anode 2 where electrolysis splits the water into hydrogen protons or ions ($H^+$) which in turn travel through a membrane 50 to the nearby cathode 38 where it forms $H_2$ and is separated from the fluid at a separation unit 40 and delivered to the surface in a conduit 43 and oxygen ($O_2$), collected in a separation unit 41 and delivered to the surface in a separate conduit 44. The proton exchange membrane electrolysis reactor may be at the bottom of the well, along the well bore or at the surface. FIG. 8 shows a process flow diagram for the PEM Down Bore Method is the same as FIG. 2 process flow diagram except that the proton exchange membrane reactor 51 is substituted for the down bore electrolysis system 21.

In some embodiments, water of sufficient temperature at the surface will flow through the closed-loop system and increase in pressure and, potentially in very hot geothermal resources, increase in temperature sufficiently to reach a supercritical state. The electrical energy required to electrolyze and split water using the methods specified herein is much reduced for water in a supercritical state, thereby enhancing the overall efficiencies of water electrolysis.

In some embodiments, the closed-loop system will be disposed in a well with a U-loop configuration that can be used to enhance the production of hydrogen down bore by using heat from the geothermal resource and increased pressure of the fluid down bore created by the weight of the fluid, thermal expansion of the fluid and, if needed, additional pressure from pumping to cause the circulating fluid to have high pressure. FIGS. 9, 10, 12, 13, and 14 show such a U-Loop disposition of the closed-loop system for use in hydrogen production in various methods. Purpose-drilled wells can be used which are tailored to the resource and surface conditions most appropriate for techno-economic optimization of the overall system. Some geothermal wells or oil and gas wells may be repurposed for hydrogen production by serving as the vertical portions of the U-loop and being retrofit by connecting them with laterally drilled segments. Such wells, whether purpose-drilled or retrofit existing wells, would be drilled and completed as described herein while selecting a hydrogen production method from the following methods that are best suited to the geothermal resource, well history, well specifications and the existing surface power and infrastructure. Any such repurposed wells selected for retrofit in this fashion may be entirely unproductive or marginally productive for their original purpose but can be retrofit with a closed-loop hydrogen production system at very low cost given that the well has already been drilled and cased and that the characteristics and history of the well and the surrounding geothermal resource are well known and easily verified.

Hydrogen may be produced in some embodiments from the U-loop configuration as shown in FIGS. 9, 10, 12, 13, and 14 using a variety of methods, including the AE Down Bore Method in horizontal or vertical electrode position, the AE zero gap cell, the SOEC Down Bore Method and the PEM Down Bore Method.

Figure 9:
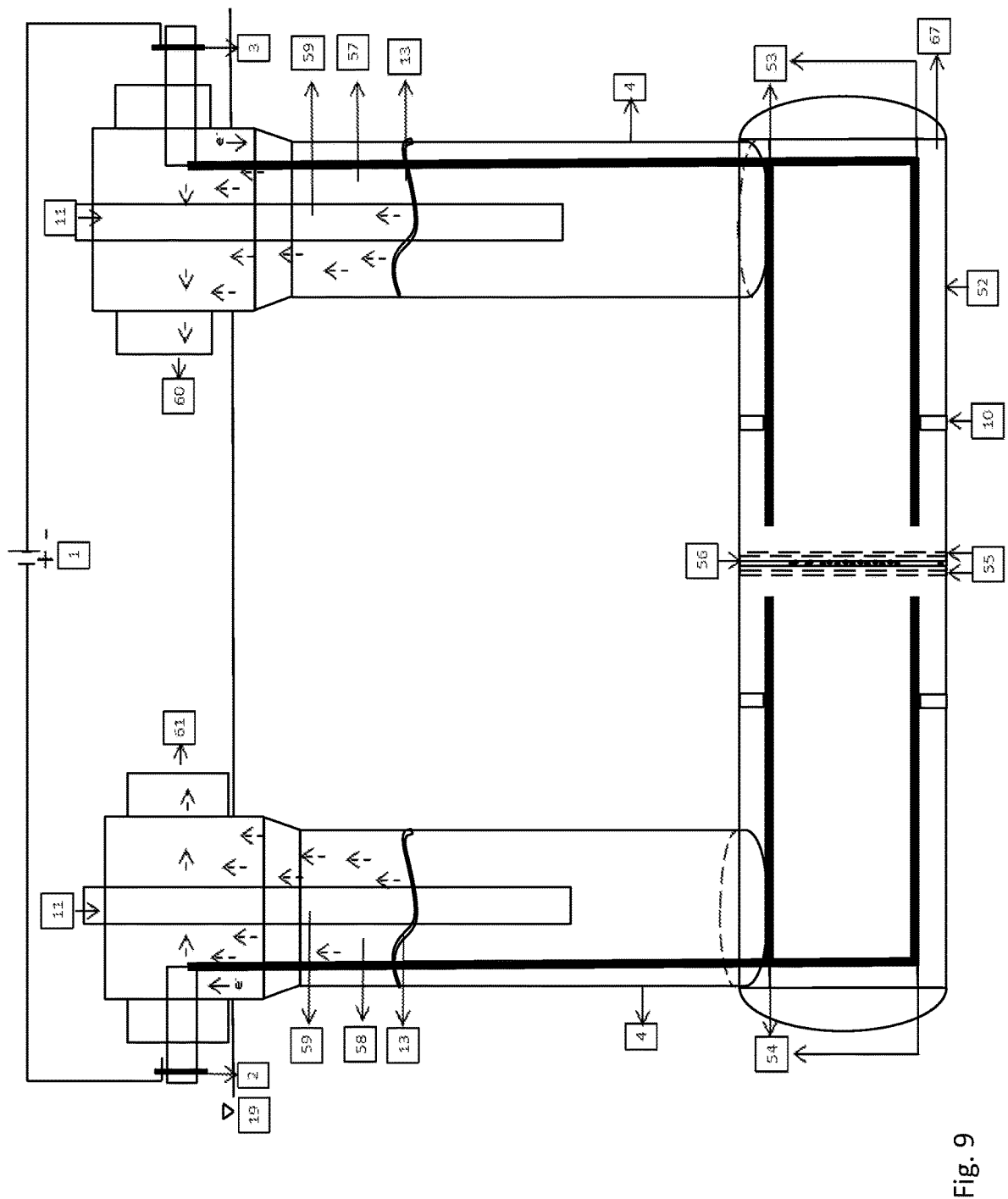
FIG. 9 is an illustration of a U-Loop closed-loop system for use in producing hydrogen with the AE Down Bore Method in a designed full conversion flow rate system with horizontal electrode position.

In some embodiments, as shown in FIG. 9, the AE Down Bore Method is employed inside the horizontal connection 52 of the borehole geothermal system. The electrodes (cathode 53 and anode 54) are horizontally installed and supported by centralizers 10. Water and electrolyte 11 are injected down bore through pipe 59 at an optimal flow rate set to match the hydrogen and oxygen gas production rates. A possible water/electrolyte level 13 is also shown in FIG. 9. Electrolysis occurs between cathode 53 and the anode 54 as described above for the AE Down Bore Method. Between the electrodes a circular grating 56 is installed to separate hydrogen and oxygen formed in each electrode side that also supports the circular gas separator membrane 55 that is lined around the grating. This membrane is impermeable to gases but is permeable to the electrolyte solution. Hydrogen gas is collected at pipe 57 and rises to the surface outlet 60 and oxygen gas is collected at pipe 58 and rises to surface outlet 61.

Figure 10:
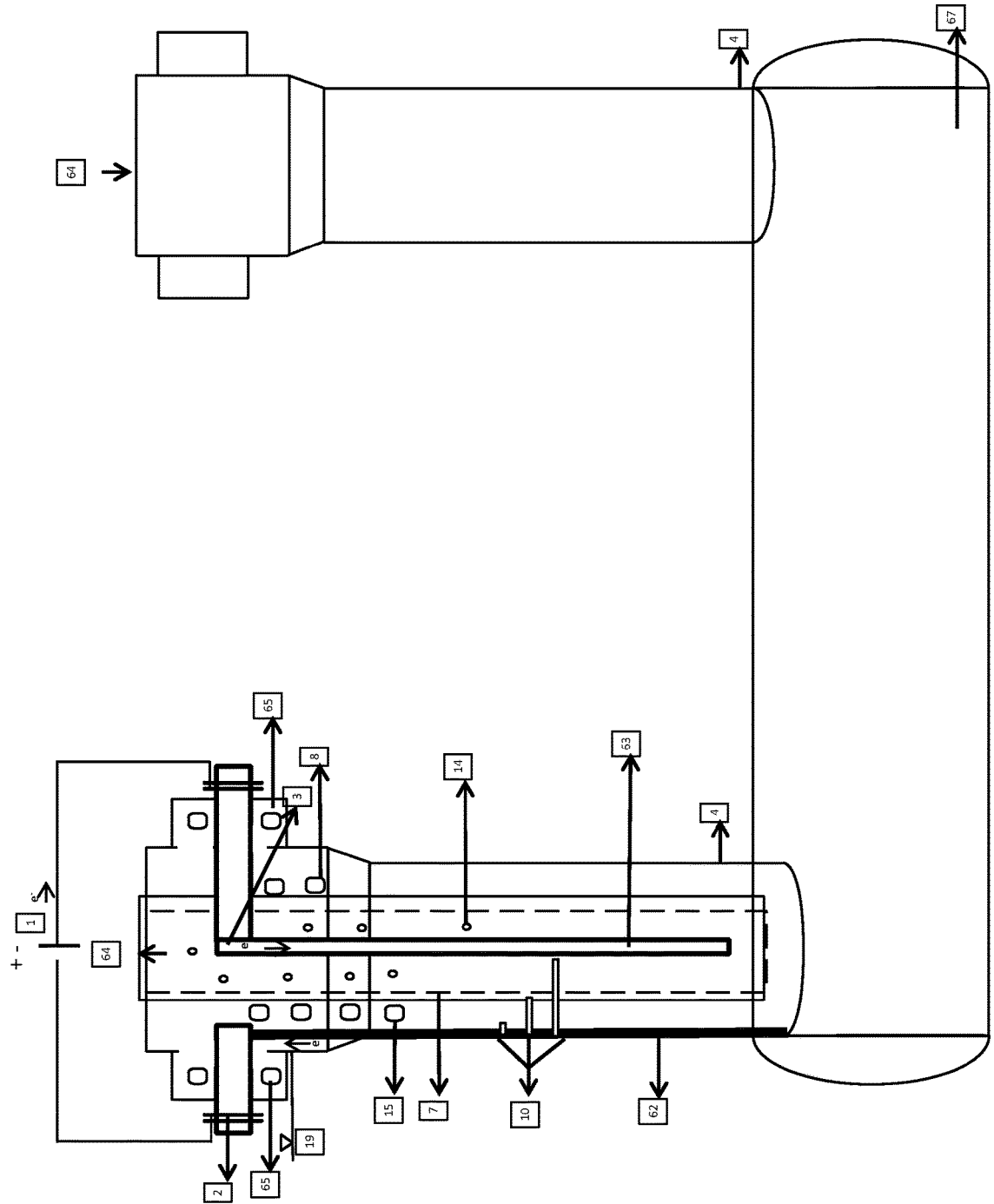
FIG. 10 is an illustration of a U-Loop closed-loop system for use in producing hydrogen with the AE Down Bore Method in a designed full conversion flow rate system with vertical electrode position.
Figure 11:
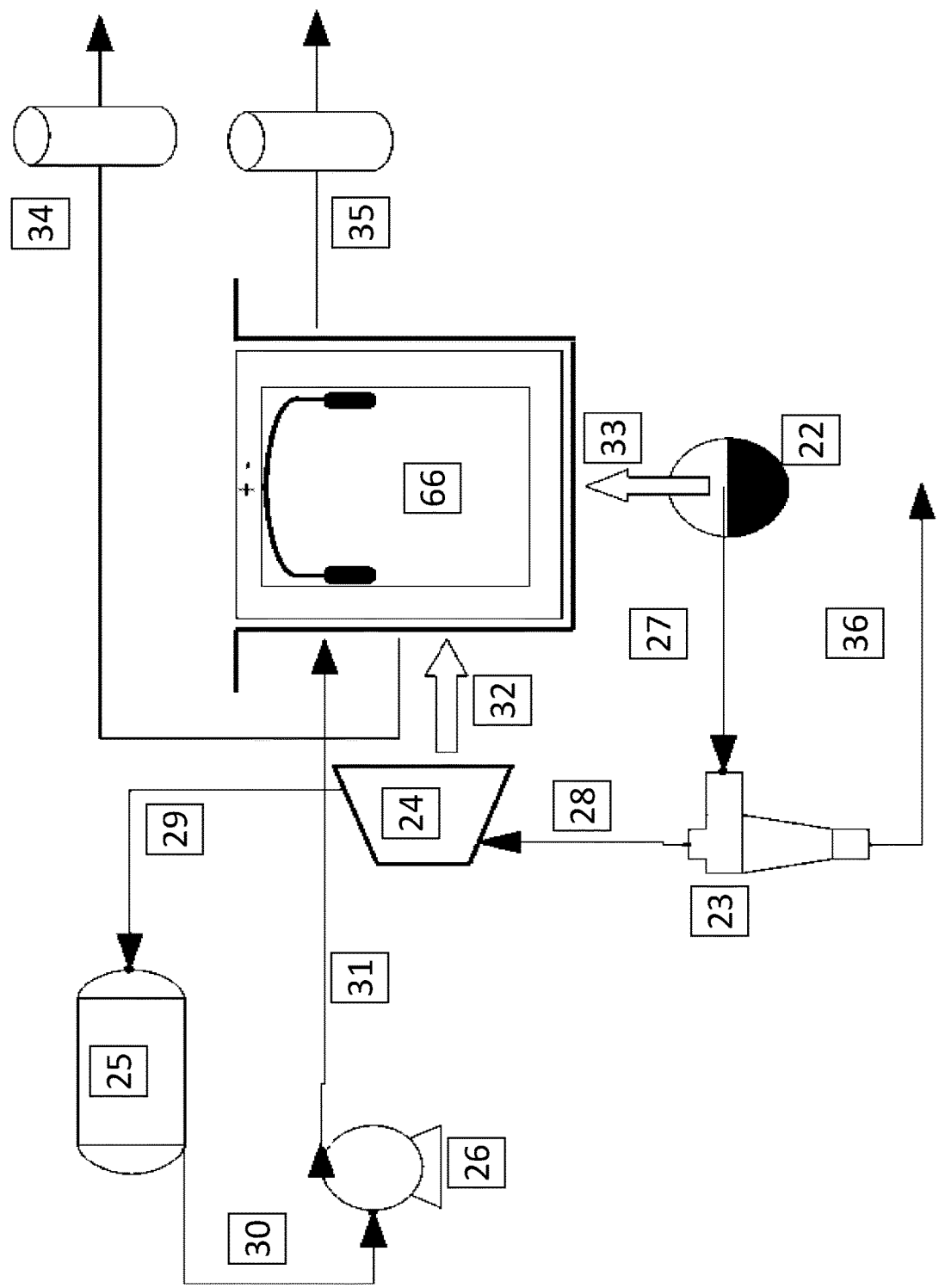
FIG. 11 is a process flow diagram of a closed-loop geothermal system for producing hydrogen with AE Down Bore Method in a designed full conversion flow rate system according to embodiments herein.

FIG. 10 depicts an embodiment for the production of hydrogen by using AE Down Bore Method with vertical electrodes position in one side of the U-loop configuration. The water and electrolyte are injected at 11 at an optimal flow rate set to match the hydrogen and oxygen gas production rates. The vertical pipe anode 62 constitutes the inner lining of the well casing 4. The pipe cathode 63 and a perforated pipe 7 with its gas separator membrane 8 are disposed in the well in a coaxial fashion making concentric tubes. Centralizers 10 support and separate the concentric tubes. The electrolyte solution passes through the concentric perforated pipe 7 that supports and lines the gas separator membrane 8 which is permeable to the electrolyte. Hydroxide ions (OH⁻) can travel through the aqueous electrolyte where is oxidized to form oxygen ($O_2$) consequently the hydrogen proton is reduced gaining an electron and forming hydrogen ($H_2$). The gas separator membrane 8 is impermeable to gases (hydrogen and oxygen) that also are formed on opposite sides of the membrane. Hydrogen gas $H_2(g)$ is transported to the surface in the annulus between the cathode pipe 63 and the membrane 8 to its outlet at the surface 65. Oxygen gas $O_2(g)$ 15 is transported to the surface in the annulus between the perforated pipe 7 and the well casing 62. FIG. 11 shows the process flow diagram for the U-loop AE Down Bore Method with full conversion which is the same as the process flow diagram in FIG. 2 except that the alkaline electrolysis system 66 is substituted for the down bore electrolysis system 21.

Figure 12:
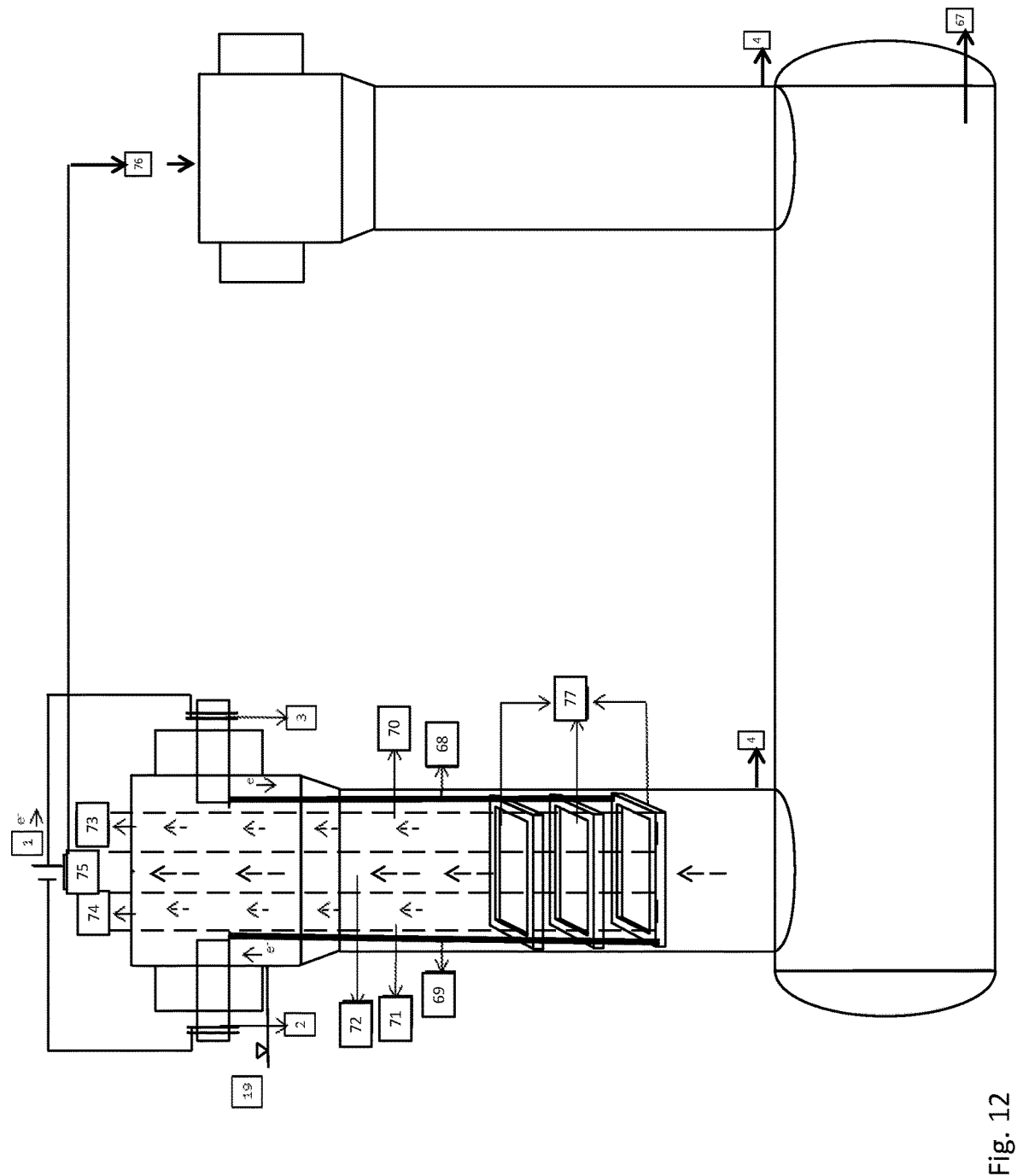
FIG. 12 is an illustration of a U-Loop closed-loop system for use in producing hydrogen with the AE Down Bore Method using a zero gap cell with continuous flow and recirculation.
Figure 13:
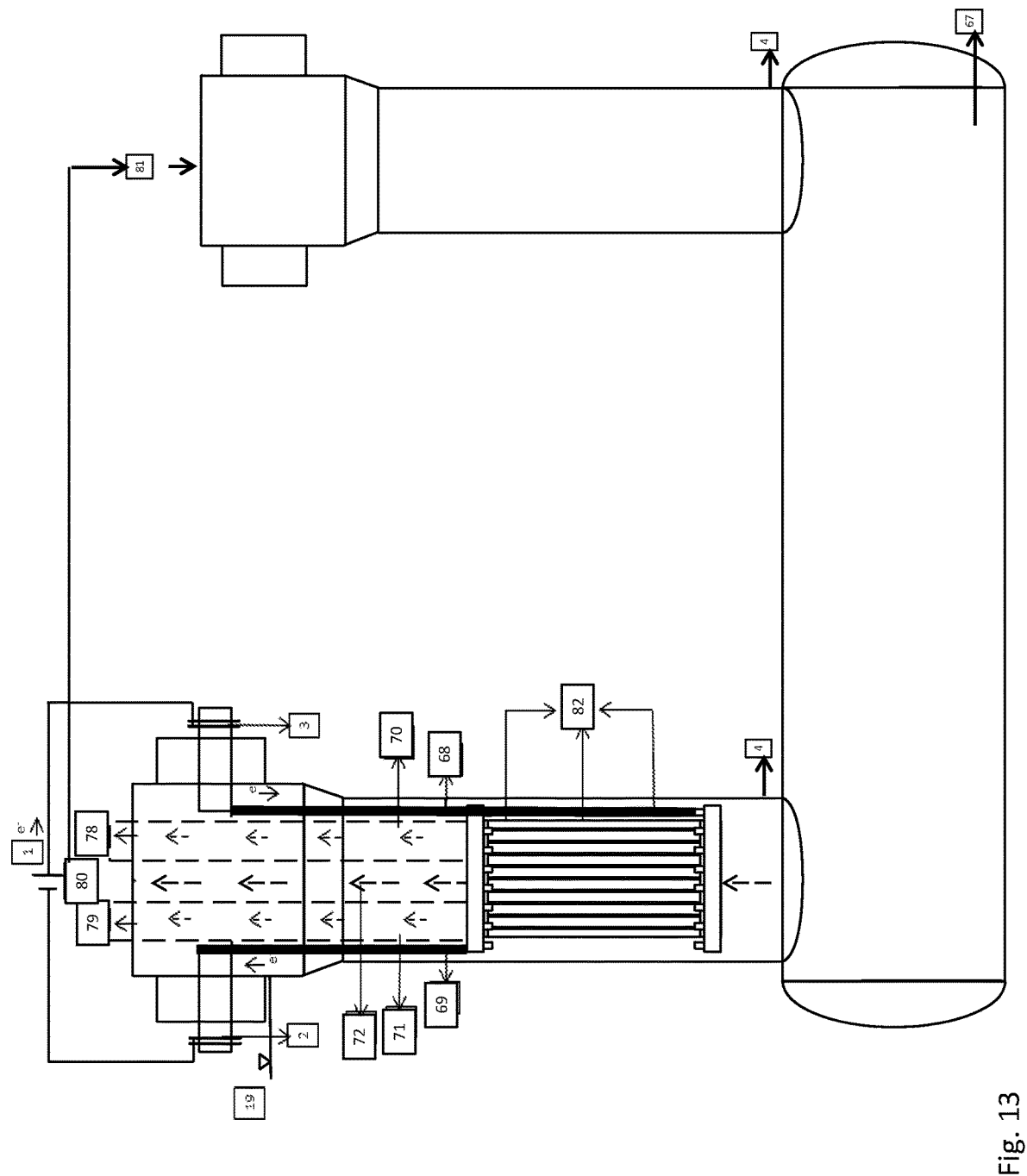
FIG. 13 is an illustration of a U-Loop closed-loop system for use in producing hydrogen with the SOEC Down Bore Method with continuous flow and recirculation.
Figure 14:
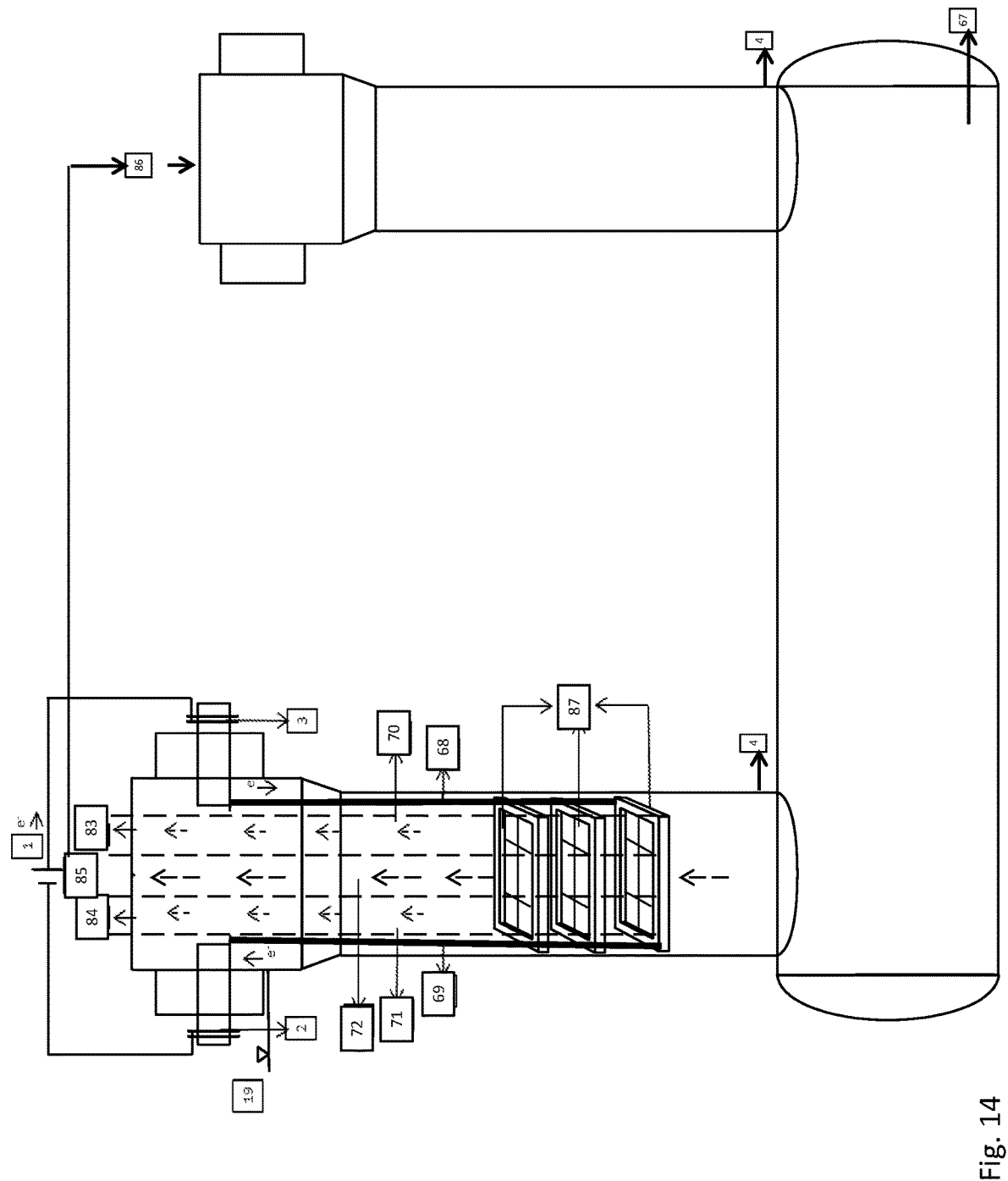
FIG. 14 is an illustration of a U-Loop closed-loop system for use in producing hydrogen with the PEM Down Bore Method with continuous flow and recirculation.

Some embodiments may use the U-loop configuration systems shown in FIGS. 12, 13, and 14 are down bore electrolysis systems that differ from the systems shown in FIGS. 9 and 10 in that they are designed to operate in continuous flow with fluid recirculation.

In the U-loop AE Down Bore Method with zero gap electrolysis in continuous flow with recirculation is depicted in FIG. 12. The fresh water/electrolyte is injected at 76. The water/electrolyte passes through the horizontal section 67 where it is heated by the geothermal resource and is forced through the zero gap cells 77 that are disposed transverse to the flow. Inside the zero gap cells the flow is divided and electrolysis occurs supported by the voltage differential and current provided by the vertical electrodes 68 and 69 that represent the cathode and anode respectively. The hydrogen produced by the cells is collected into the conduit with outlet 73 and the produced oxygen is collected into the conduit with outlet 74. Unconverted water/electrolyte flows through its conduit and outlet 75 and stream from this flow may be recycled into the system with stream 76 to recirculate in the closed loop.

Some embodiments may use the SOEC Down Bore Method with a U-loop configuration and continuous flow and recirculation as shown in FIG. 13. The water/electrolyte is injected at 81 and passes through the horizontal section 67 where it is heated by the geothermal resource and then flows into a solid oxide electrolysis cell (SOEC) unit 82, which SOEC unit may be situated down bore, on the surface or between the two positions. In each case the injection rate of water in the continuous process is optimized to produce maximum hydrogen conversion at an optimal recirculation cost. After electrolysis in the SOEC unit 82, the hydrogen produced from the cathode 68 is transported in the pipe 70 and then delivered to the surface at the outlet 78. Similarly, oxygen produced from the anode 69 is transported through the pipe 71 and delivered to the surface at the outlet 79. Unconverted fluid from the SOEC unit 82 passes through the pipe 72 and may be recirculated from the outlet 80 to the input stream 81 to restart the closed-loop process.

Some embodiments may use PEM Down Bore Method in a U-loop configuration with continuous flow and recirculation as depicted in FIG. 14. The water/electrolyte is injected at 86. The fluid passes through the horizontal section 67 where it is heated by the geothermal resource and then is forced through the proton exchange membrane (PEM) units 87 disposed in parallel and transverse to the flow. Inside the PEM units the flow is divided and electrolysis occurs supported by the voltage differential and current provided by the vertical electrodes 68 and 69 that represent the cathode and anode respectively. After electrolysis in the PEM units, hydrogen is collected in the conduit 70 and ascends to the outlet 83. Similarly, oxygen is collected in the conduit 71 and ascends to the outlet 84. Unconverted water/steam from its outlet 85 may be recycled into the system with stream 86 to restart the closed-loop process.

Figure 15:
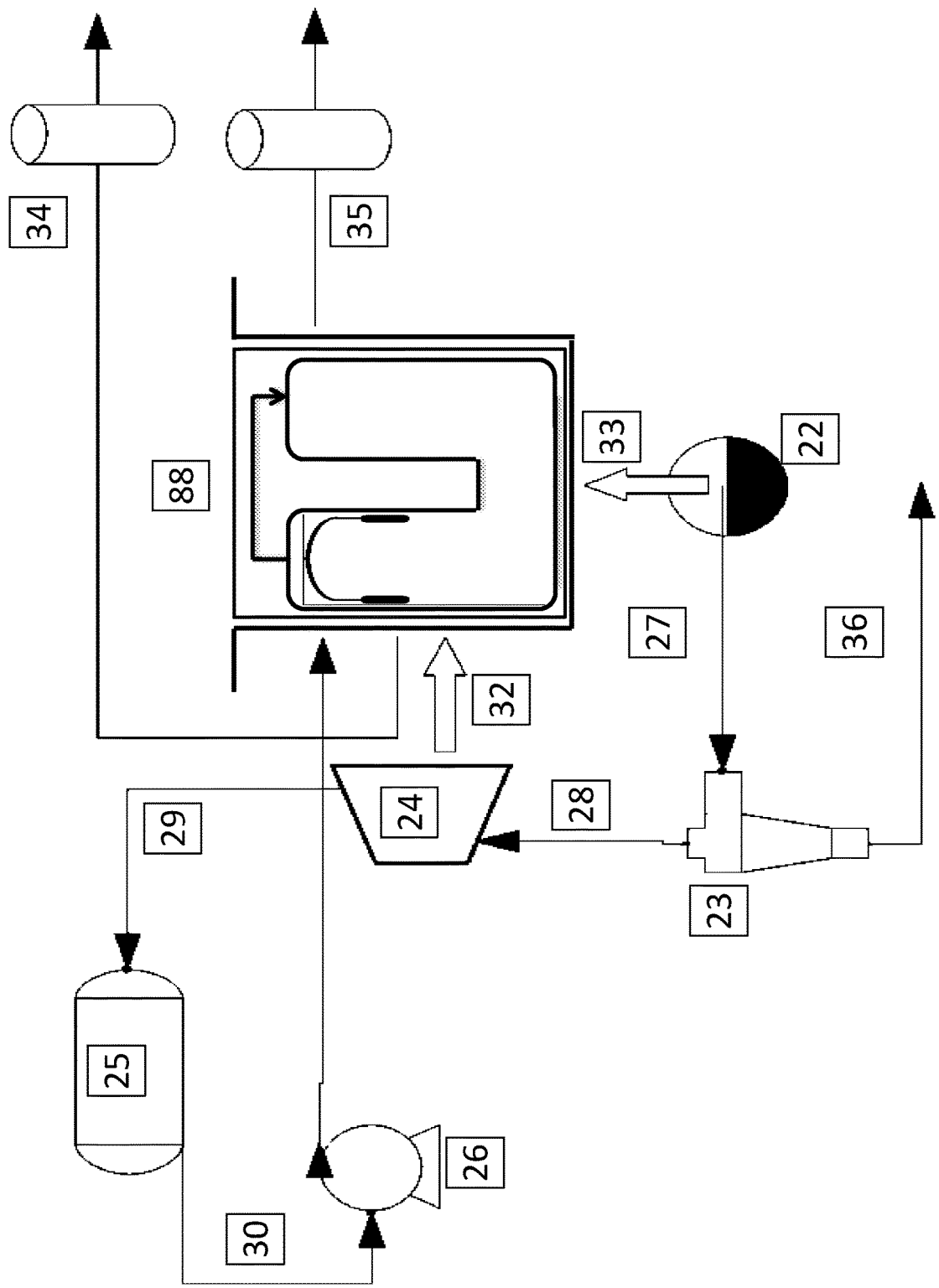
FIG. 15 is a process flow diagram of a U-Loop closed-loop geothermal system for producing hydrogen with the AE Down Bore Method, the SOEC Down Bore Method or the PEM Down Bore Method for use in a batch process according to the embodiments herein.

A process flow diagram of the U-loop configuration for down bore hydrogen production using each the AE Down Bore Method with or without zero gap electrolysis, the SOEC Down Bore Method, and the PEM Down Bore Method with continuous flow with recirculation as shown in FIGS. 12, 13, and 14 respectively are represented in FIG. 15. The electrolysis method 88 represent each of the embodiments and components previous described for each of the three methods. FIG. 15 is the same as the FIG. 2 process flow diagram except that the electrolysis method 88 is substituted for the down bore electrolysis system 21.

In yet other embodiments of the present invention, hydrogen may be produced from the U-loop configuration using each of the AE Down Bore Method, the SOEC Down Bore Method and the PEM Down Bore Method at the surface using preheated makeup water from the closed-loop down bore heat exchanger for the splitting water process at enhanced thermodynamic conditions. Also, temperatures and pressures may be precisely controlled with this configuration and process to cause water to reach supercritical status, reducing the energy requirements for electrolysis substantially.

Figure 16:
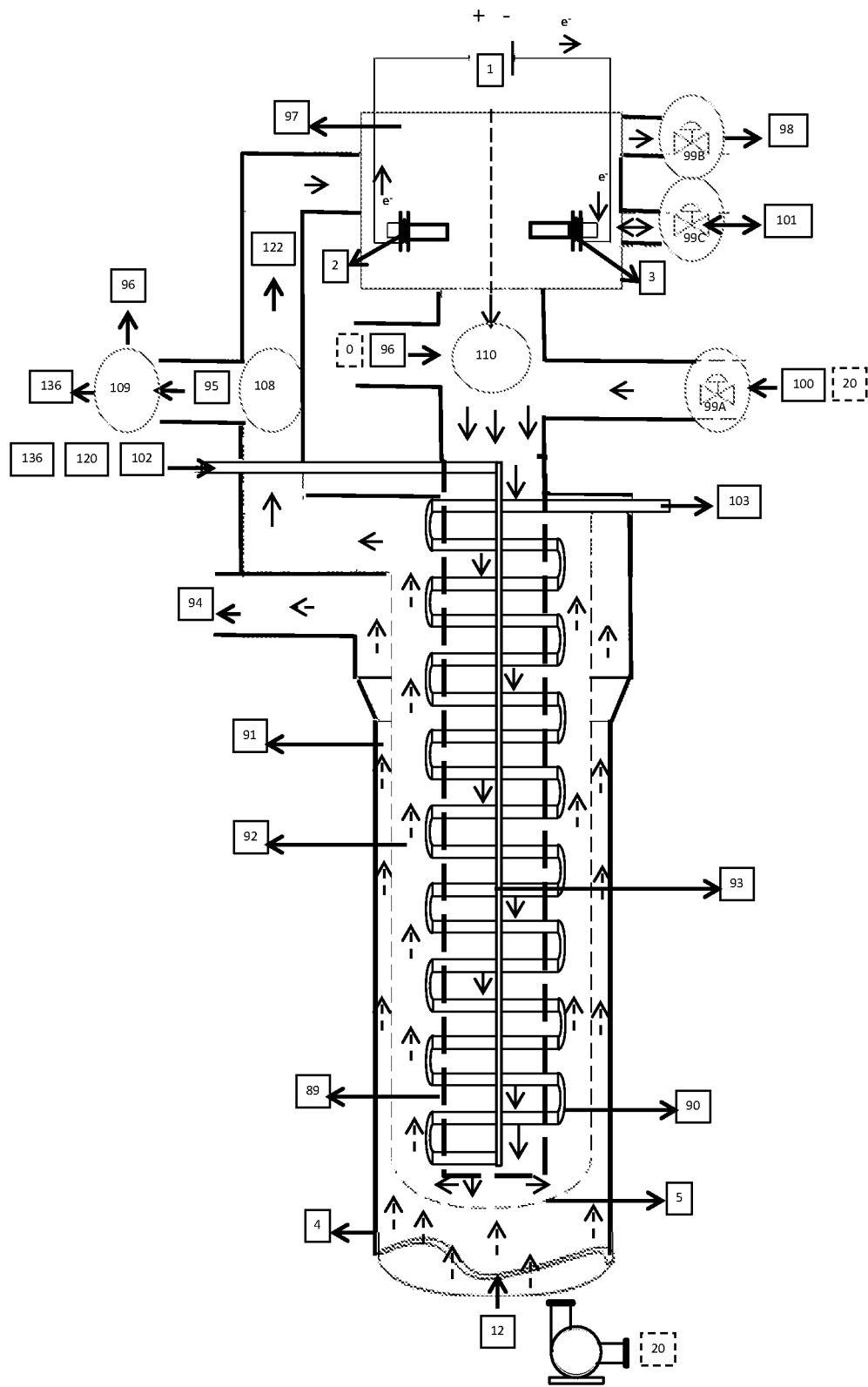
FIG. 16 is an illustration of a coaxial down bore closed-loop system for use in producing hydrogen with the coupled CuCl Down Bore Method and POX Down Bore Method according to the embodiments herein.

Another aspect of the present invention is that the closed-loop can be configured in a coaxial fashion with an apparatus and system circulating fluids and acting as down bore reaction chambers to cause chemical reactions to make hydrogen by coupling a copper chloride reaction method (CuCl Down Bore Method), a partial oxygenation reaction method (POX Down Bore Method) and/or an autothermal reforming method (AR Down Bore Method). Each of these methods utilize heat from the geothermal resource, high pressures in the closed-loop systems and the various endothermic and exothermic chemical reactions in such methods to enhance the production of hydrogen. FIG. 16 generally describes these coupled chemical reactions.

In another embodiment of this invention a coaxial close-loop configuration shown in FIG. 16 in which exothermic hydrocarbon oxidation reaction occurs in a serpentine tube 90. This spiral serpentine tube 90 wraps around a concentric tube 89 that is part of the down bore CuCl cycle route. The concentric tube and the spiral tube fixed together so as to always be in direct contact, thereby maximize the heat exchange between them. Both tubes are enclosed down bore by the close-loop casing 5 which, in turn, is disposed inside the well casing 4. The fluid 91 that is transported in the annulus between closed-loop casing 5 and well casing 4 is the ascending geothermal well fluid (water, steam, and/or brine). The fluids 92 that are transported in between the closed-loop casing 5 and the concentric tube 89 are the copper chlorine fluids, which fluids change in composition at each stage of the reaction mechanism progress. The fluid 93 that is transported downward in the spiral tube is a mixture of hydrocarbon and oxygen that react in a partial oxidation combustion reaction (i.e. methane and oxygen). The streams 12 and 94 are the input and output of the geothermal fluid from the reservoir respectively. The streams 102, 120, and 136 are the input and the stream 103 the output of the POX method. The input stream for the CuCl cycle is 100 and the output streams are 95, 98, and 101 (in different steps that are explained below with an example). Valves 99A, 99B, and 99C are used to control flow direction and control specific streams and outputs for specific reaction mechanism conditions at the appropriate stages of the process. Stream 96 may comprise a recycling stream (after a separation process) whereby the fluid comes back to the system at the conditions desired depending on the step of the CuCl cycle. The surface electrolysis unit 97 can be provided with a variety of appropriate electrolysis methods.

Figure 17:
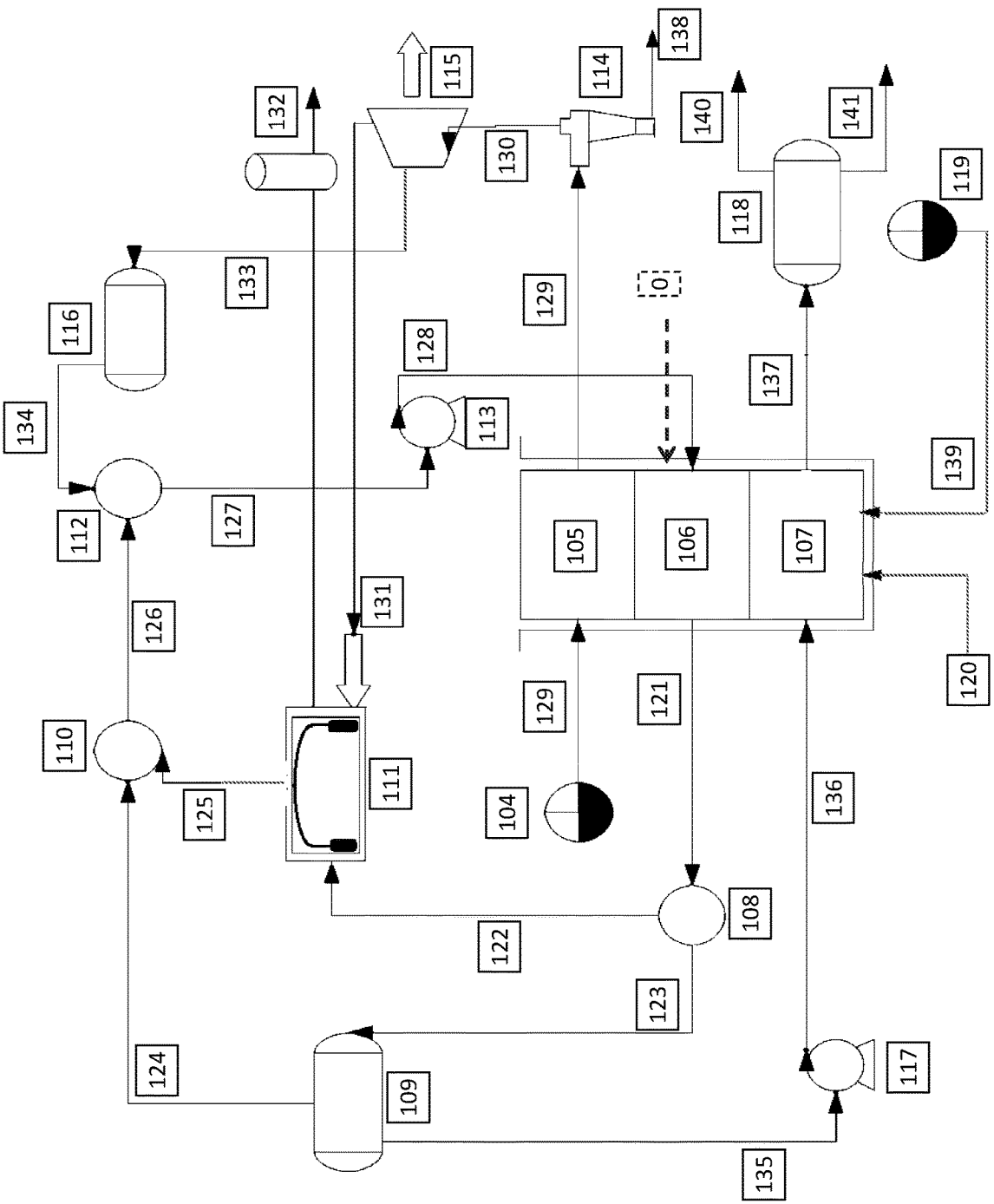
FIG. 17 is a process flow diagram of a closed-loop geothermal system for use in producing hydrogen with the coupled CuCl Down Bore Method and POX Down Bore Method according to the embodiments herein.

FIG. 17 shows the process flow diagram for use in the coupled CuCl Down Bore Method and POX Down Bore Method. The down bore well 104 may coproduce water/steam 129 passing through the down bore close-loop system that is divided in three levels: The heat exchange process 105, the beginning of the CuCl Down Bore Method 106, and the beginning of the POX method 107. Following the sequence of the CuCl cycle route, the stream 128 feeds the 106 down bore process, where the hydrolysis at high temperature occurs. The $Cu_2OCl_2$ flows in 121 to a valve/divisor 108 that delivers flow to two different components (depending on the step of the cycle or when the cycle works at specific temperature conditions for desired product separation). Stream 123 goes to the decomposition reactor where oxygen is formed and separated 109 and the oxygen that is separated may be used in the POX cycle but it will be connected to the cycle as explained below. As a separate step and parallel to the stream to the decomposition reactor 109, the valve/divisor 108 delivers the parallel stream 122 to the electrolysis system 111 at the desired temperature for such electrolysis process. Stream 124 connects the decomposition reactor 109 to the chlorinator reactor 110. Stream 125 connects the electrolysis system 111 to the chlorinator reactor 110 that regenerates the copper chlorine solution using the chloride subproduct of the electrolysis system 111 and the product of the decomposition reactor 109, thereby producing the $CuCl_2$ transported in stream 126. This stream is mixed with the fresh water stream 134 to be transported in solution 127 by a pump 113 to complete the downbore CuCl cycle. The electrolysis system 111 produces a hydrogen stream 132 that is the desired product of this cycle. In this way the valve/divisor 108 works to control a number of steps in the cycle and is related to the reaction temperature of the mechanism chosen. For example, with reference to FIG. 16, when another specific desired separation temperature is reached in stream 92, the valves 99 are used to separate or allow flows into the cycle for a second circulation route in which the stream may be directly delivered to the electrolysis system 111. Referring again to FIG. 17, the product of the chlorination reactor 110 may go to a mixer tank 112 where the initial solution of the cycle is regenerated with fresh water 134 that comes from the condenser 116. Following the sequence of the coproduction geothermal fluids route, the coproduced fluid from the well 104 ascends along the closed-loop apparatus which is heated to reach the thermodynamic conditions of stream 129 and pass through a separator 114. The liquid phase 138 may be reinjected or used in another exchange process and the gas phase fluid 130 may pass through a turbine 115 to produce power that may be routed 131 and used in the electrolysis system 111. Electrical power produced may also be delivered to the electrical network, the heat exhausted fluid 133 may go to the condenser 116, and the output stream 134 may be used in the CuCl cycle and mixed at 112. Following the sequence of the POX method route, the oxygen that was separated from the decomposition reactor 109 in stream 135 is compressed in 117 and flows in stream 136 to the spiral reactor 107 where it reacts with the hydrocarbon (that may be methane) in a partial oxidation method but can also react with hydrocarbon and water using the autothermal reforming method. If the well 104 is located in an oil/gas field, another productive oil/gas well 119 may supply the hydrocarbon to the spiral reactor 107. Also fresh oxygen may complement the oxygen requirements for the POX reaction or autothermal reforming method that may occur in the reactor 107. The products of the reactor 107 shown in stream 137 may be separated in a pressure swing adsorption (PSA) process 118 to produce hydrogen 140 and syngas 141 as parallel products.

The embodiment shown in FIG. 16 can be used in different thermochemical split cycles or mechanisms. These cycles or mechanisms may occur at low, intermediate, or high temperatures. For example, for a reaction mechanism of a copper chlorine cycle at an intermediate temperature range of between 600K and 800K, the reaction process consists of four steps: hydrolysis of copper (II) chlorine ($CuCl_2$), decomposition of copper oxychloride ($Cu_2OCl_2$), chlorination of copper (I) chlorine (CuCl), and electrolysis of hydrogen chloride (HCl). Two process steps are expected in this example. In the first process step the flow rate of methane ($CH_4$) and oxygen ($O_2$) in streams 102, 120, and 136 are adjusted to effectively control the $Cu_2OCl_2$ decomposition reaction temperature requirements which may occur at in the down bore reactor 89. The output of the reaction from the spiral tube 90 is hydrogen ($H_2$) and monoxide carbon (CO) in stream 103. When the flow rate and temperature in the spiral tube is controlled and stable water ($H_2O$) and copper chlorine (II) ($CuCl_2$) are injected in the input stream 100, valves 99A should allow the flow to enter into the down bore apparatus. Hydrolysis and heating processes may occur down bore. Due to the exothermic reaction in the spiral tube, heat will be transferred to the down bore reactor 89 such that the temperature of the ascending stream 92 may reach the specific reaction temperature necessary to provide energy for the $Cu_2OCl_2$ decomposition reaction. The divisor 108 splits the stream as outputs 95 and 122. The stream 95 may go to a surface copper oxychlorine decomposition unit 109 where the separated oxygen 136 may be collected, recycled and compressed into the partial oxidation serpentine conduit with the stream 102 and fresh oxygen stream from air 120. The stream 95 is the hydrogen chloride that goes directly to the electrolysis system. The copper (I) chlorine (CuCl) 96 separated from 109 is reinjected to the cycle in the chlorination reactor 110. In the startup of the electrolysis system $CuCl_2$ or stream 0 is required to be injected with stream 100 into the apparatus to allow the continuous cycle to operate. After the chlorine is produced from the electrolysis system the stream 0 may be stopped. In the second step cycle route, the flows 102, 120 and 136, and 139 will be controlled or the AR Down Bore Method can be combined with POX Down Bore Method to decrease the temperature in the spiral reactor 90, consequently decreasing the temperature in 89. The stream 92 should reach the desired temperature for the second step reaction and the hydrogen chloride (HCl) stream 122 that was produced down bore flows to the electrolysis system 111. Hydrogen is produced in stream 98 and chlorine is injected down bore. The water requirements to be split in the CuCl cycle may be supplied by the condensed water 100.

The circulation system for circulating a fluid containing copper chloride ($CuCl_2$) and water as shown in FIG. 16 at 92 may be by means of a pump and/or thermosiphon effect through a closed-loop pipe system, which may be a tube-in tube assembly where the inner tube flow is insulated from the flow in the annulus around the inner tube, which closed-loop pipe system acts as a down bore heat exchanger (DBHX) and is deposed in a well deep into a geothermal resource wherein thermal energy from the geothermal resource is transferred to the circulating fluid and the pressure of the fluid down bore is increased by the weight of the fluid, thermal expansion of the fluid and, if needed, additional pressure from pumping to cause the circulating fluid to have high pressure. An endothermic hydrolysis reaction occurs in such circulation system whereby liquid $CuCl_2$ and water react at high temperature and pressure to form HCl and solid $Cu_2OCl_2$, such reaction being followed by an endothermic decomposition reaction in which solid $Cu_2OCl_2$ is converted to $CuCl_2$ and $O_2$. Also, an exothermic chlorination reaction of solid $CuCl_2$ and $Cl_2$ gas occurs to form solid $Cu_2Cl_2$. Finally, an electrolytic reaction hydrogen production reaction occurs in which HCl is split into $H_2$ and $Cl_2$ gases.

Another circulation system is shown in FIG. 16 circulating methane ($CH_4$) in a piping system 90 wrapped in a spiral, or other closely connected, manner around the aforementioned DBHX wherein an exothermic partial oxidation reaction (POX) occurs whereby $CH_4$ is oxidized to form CO and $H_2$ gases. Heat from this combustion is transferred through the spiral closed-loop into the inner tube 89 through which $CuCl_2$ descends in the CuCl cycle to provide energy for the endothermic hydrolysis and copper oxychloride decomposition reactions described in FIG. 16.

The same closed-loop piping system 90 wrapped in a spiral, or other closely connected, manner around the aforementioned DBHX can be used in an autothermal reforming reaction constituting the AR Down Bore Method by adding water vapor to the system at stream 102 to cause the methane in this closed-loop to produce $H_2$, CO and $O_2$ in an endothermic reaction. Whether the spiral closed-loop piping system is used to make hydrogen using the POX Down Bore Method or the AR Down Bore Method will depend on a variety of factors, including heat transference from and into the geothermal resource, the extent to which excess heat from the POX exothermic transaction is captured in the CuCl cycle, down bore pressures, and operational considerations. However, the flexibility of increasing temperature in and from the spiral closed-loop piping system with the POX Down Bore Method and reducing such temperature with the AR Down Bore system is an operational advantage of the system.

As methane ($CH_4$) is the key input for making hydrogen when using both the POX Down Bore Method and the AR Down Bore Method, the availability of methane proximate to the geothermal resource to be used is an advantage. Hence, operating the CuCl Cycle and POX Down Bore Method or AR Down Bore Method in a fossil fuel area with ample methane immediately available to use is an advantage and method of using methane to make hydrogen as a green fuel, albeit with a lesser level of carbon (in the form of carbon monoxide) being released to the environment than if the overall energy produced (including energy produced in the form of hydrogen) solely from the burning of methane. In addition to the proximity of methane, operating in a fossil fuel area has a large advantage in that spent or otherwise unused oil and gas wells can be retrofit for the CuCl Cycle with POX Down Bore Method or AR Down Bore Method, thereby avoiding the high cost of drilling entirely new wells.

Figure 18:
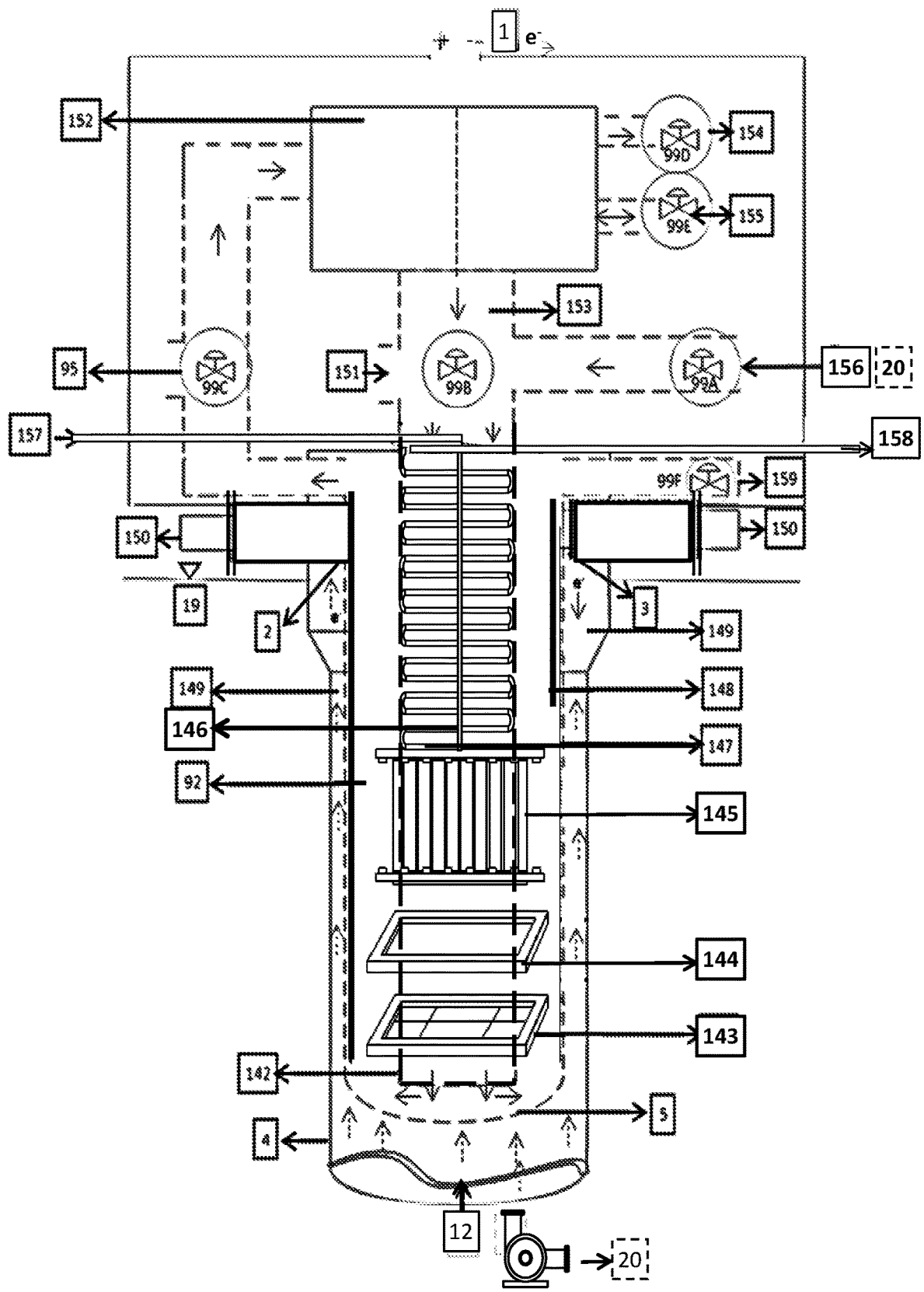
FIG. 18 is an illustration of a coaxial down bore closed-loop system for producing hydrogen with various methods while coproducing geothermal brine for power production and brine recycling according to the embodiments herein.

FIG. 18 represents a generic coaxial closed-loop system for producing hydrogen with various methods using the POX Down Bore Method with various electrolysis methods down bore, whereas FIG. 16 shows electrolysis methods operating at the surface. FIGS. 16 and 18 both shows the coproduction of geothermal brine from a producing well but may also be applied to unproductive wells retrofit for this system. Various electrolysis methods may be used, including the AE Down Bore Method (shown here with zero gap electrolysis), SOEC Down Bore Method, and/or the PEM Down Bore Method, in each case coupled with the POX Down Bore Method. In such embodiments, the cycle starts with the introduction of a hydrocarbon (such as methane) and oxygen in stream 157 which combine in an exothermic reaction to increase the heat that is used in the various reactions. This exothermic reaction is useful in providing enabling the production of hydrogen and carbon monoxide in stream 158. The exothermic reaction in the spiral tube 147 enables the transfer of heat to the concentric tube 142. In this concentric tube, water, which was injected in stream 156 (valves 99A and 99B controlling the flow direction to the down bore concentric tube 142), changes phase to vapor or supercritical conditions. Steam or supercritical water is forced to pass through an electrolysis system which may include an SOEC 145, a zero gap cell 144, a PEM cell 143, other electrolysis systems or a combination of such systems) where electrolysis occurs at high temperature and pressure. Hydrogen is separated in tube 148 and is output at 159. Oxygen is transported in tube 92 and is output through valve 99C. Oxygen in stream 95 can be used to feed stream 157 requirements of the POX reaction. The exothermic temperature produced in the spiral tube 147 can also be useful to retrofit a failure geothermal well or a non-productive oil/gas well. Water confined in the annulus between well casing 4 and closed-loop casing 5 is shown in stream 12. This water will flow due to enhancement in temperature of the exothermic reaction, phase change or also can be supported with a electronic submergible pump (ESP) 20. The water transported through the ascending annulus 149 is collected in the surface in the stream 150. A process pressure swing adsorption (PSA) system 152 can be included for purification of hydrogen, as appropriate, from stream 158.

Figure 19:
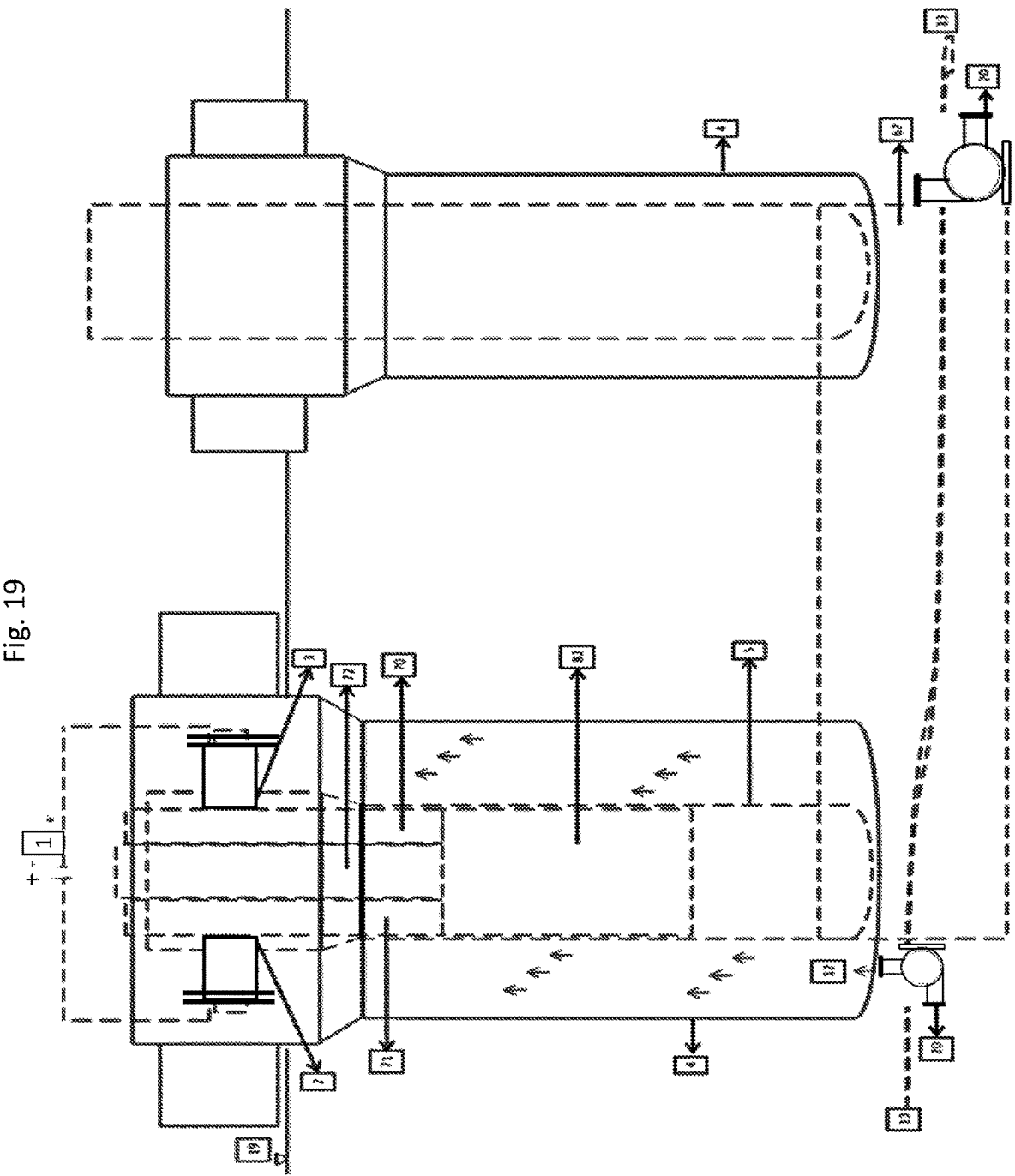
FIG. 19 is a simplified process flow diagram of a system for coproduction of energy in U-loop systems.

An additional aspect of the each of the embodiments herein is that electricity may be produced from the oxygen and hydrogen produced by the such embodiments. For example, with reference to FIG. 18, oxygen in tube 92 can pass through valves 99C and 99D and enter to a fuel cell 152 and react with hydrogen delivered from 159 to 155.

Where such coaxial closed-loop systems and assemblies described herein are disposed in a producing geothermal well such that geothermal brine or steam is produced in the annulus between the well casing or liner and such closed-loop systems and assemblies, such process is called coproduction. An example schematic of such a configuration is shown in stream 12 of FIGS. 1, 3, 5, 7, 16, 18, and 19. It is anticipated that existing producing geothermal wells will have the enthalpy and integrity to be used to produce hydrogen with a higher value than simple steam that must be converted to lower value electricity in steam turbines with the attendant efficiency losses. As a result, the economics of the proposed hydrogen production methods from geothermal resources may compel the conversion of conventional geothermal wells to hydrogen production. This creates the opportunity to use the coproduced brine for a variety of purposes, including the continued delivery of steam to the existing steam plant system on the surface for the production of electricity or placing well head turbine generators at the well heads to produce electricity, which electricity in each case may be used in the various electrolysis processes envisioned herein. Alternatively, coproduced brine and steam may be used to preheat make up water and other fluids used in the processes described herein. Finally, such produced geothermal steam and brine may be treated and used to supply water for the various hydrogen production methods herein. Also, as salts are commonly found in geothermal brine and salt water is often used as an electrolyte, such salt water may be captured and used in the electrolytic processes described herein. FIG. 19 shows that coproduction can also be useful in a U-loop system. In this figure, the component 82 represents any electrolysis method. The coproduced fluid 12 is transported in the annulus between the well casing 4 and the closed-loop casing 5. An optional electronic submergible pump 20 can be used to support the movement if it is required. Therefore, this coproduction option may be included in each of the systems described in FIGS. 9, 10, 12, 13 and 14. Alternatively, coproduced brine and steam may be used to preheat make up water and other fluids used in the processes described herein.

Finally, such produced geothermal steam and brine may be treated and used to supply water for the various hydrogen production methods herein. Also, as salts are commonly found in geothermal brine and salt water is often used as an electrolyte, such salt water may be captured and used in the electrolytic processes described herein.

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise." For example, the term "including" shall be deemed to mean "including, without limitation" throughout.

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for circulating fluids and applying electrical energy through a closed-loop down bore apparatus having a U-loop configuration, wherein two generally vertical wells are connected by another well, wherein at least a portion of the two generally vertical wells or of the another well is disposed in a geothermal resource from which thermal energy is transferred to circulating fluids and pressure of fluid in the closed-loop down bore apparatus is high, the system comprising:

a circulation system for circulating a fluid containing water from a surface through a well casing or liner by means of a pump and/or thermosiphon, wherein thermal energy from the geothermal resource is transferred to the fluid and pressure of the fluid, down bore, is increased by a weight of the fluid, thermal expansion of the fluid and, for systems including a pump, additional pressure from pumping to cause the fluid circulating to have high pressure;

an electrolysis system configured to apply electrical current to the circulating fluid wherein water having a high temperature and high pressure is used to produce hydrogen and oxygen gases by means of electrolysis using one of AE Down Bore Method, SOEC Down Bore Method or PEM Down Bore Method, which latter two methods may use an electrolysis cell or a zero gap electrolysis cell;

a control system configured to control flow rates of fluid into the closed-loop down bore apparatus and electrolysis reaction rates such that the water is fully converted to hydrogen and oxygen such that there is no, or only intermittent, flow of fluid to the surface for recirculation; and a gas collection system for collecting the hydrogen and oxygen gases produced by electrolysis and delivering the hydrogen and oxygen gases to the surface under pressure.

2. A process of producing hydrogen using the AE Down Bore Method, the SOEC Down Bore Method or the PEM Down Bore Method using the system of claim 1.

3. The process of producing hydrogen of claim 2, wherein water in supercritical phase is created from heat transferred from the geothermal resource or from additional thermal energy added at the surface together with pressure arising from a column height of the fluid, thermal expansion, or otherwise added in the closed-loop down bore apparatus to supply supercritical water for electrolysis.

4. A system for circulating fluids and applying electrical energy through a closed-loop down bore apparatus having a U-Loop Configuration where at least a portion of the closed-loop down bore apparatus is disposed in a geothermal resource from which thermal energy is transferred to the circulating fluids and pressure of fluid in the closed-loop down bore apparatus is high, the system comprising:
- a circulation system for circulating a fluid containing water from a surface through a well casing or liner by means of a pump and/or thermosiphon, wherein thermal energy from the geothermal resource is transferred to the fluid and pressure of the fluid, down bore, is increased by a weight of the fluid, thermal expansion of the fluid and, for systems including a pump, additional pressure from pumping to cause the fluid circulating to have high pressure;
- an electrolysis system configured to apply electrical current to the fluid wherein water having a high temperature and high pressure is disposed and used to produce hydrogen and oxygen gases by means of electrolysis using one of AE Down Bore Method, SOEC Down Bore Method or PEM Down Bore Method, which latter two methods may use a conventional electrolysis cell or a zero gap cell;
- a control system configured to control flow rates of fluid into the closed-loop down bore apparatus and electrolysis reaction rates such that the water is not fully converted to hydrogen and oxygen such that water continuously flows to the surface and can be recirculated; and
- a gas collection system for collecting the hydrogen and oxygen gases produced by electrolysis and delivering the hydrogen and oxygen gases to the surface under pressure.

5. A process of producing hydrogen using the AE Down Bore Method, the SOEC Down Bore Method or the PEM Down Bore Method using the system of claim 4.

6. The process of producing hydrogen of claim 4, wherein water in supercritical phase is created from heat transferred from the geothermal resource or from additional thermal energy added at the surface together with pressure arising from a column height of the fluid, thermal expansion, or otherwise added in the closed-loop down bore apparatus to supply supercritical water for electrolysis.

7. A system for circulating fluids and causing chemical reactions through a closed-loop down bore apparatus having a Coaxial Configuration where the closed-loop down bore apparatus is disposed in a geothermal resource from which thermal energy is transferred to the fluid and pressure of fluid in the closed-loop down bore apparatus is high, the system comprising:

a $CuCl_2$ circulation system for circulating a fluid containing copper chloride and water by means of a pump and/or thermosiphon through a closed-loop pipe system, which is a tube-in-tube assembly where fluid flows downward in an inner tube and upward in an annulus surrounding the inner tube, which closed-loop pipe system acts as a down bore heat exchanger and is disposed in a well within a geothermal resource wherein thermal energy from the geothermal resource is transferred to the fluid and pressure of the fluid, down bore, is increased by a weight of the fluid, thermal expansion of the fluid and, for systems including a pump, additional pressure from pumping to cause the fluid circulating to have high pressure, which pressure enhances chemical reactions;

a system configured to enable a hydrolysis process in the $CuCl_2$ circulation system whereby liquid $CuCl_2$ and water react at high temperature and pressure to form HCl and solid $Cu_2OCl_2$, such reaction being followed by an endothermic decomposition reaction in which solid $Cu_2OCl_2$ is converted to liquid $CuCl_2$ and $O_2$, an exothermic chlorination reaction of solid $CuCl_2$ and $Cl_2$ gas to form solid $Cu_2Cl_2$, and electrolytic hydrogen production reaction in which $HCl_2$ is split into $H_2$ and $Cl_2$ gases;

a circulation system for circulating methane in another closed-loop piping system wrapped in spiral manner around or is otherwise fixed to the $CuCl_2$ circulation system, wherein either:
- an exothermic partial oxidation reaction occurs whereby $CH_4$ and $O_2$ combust to form CO and $H_2$ gases; or
- water and $CH_4$ make hydrogen using excess heat in an endothermic autothermal reforming reaction method whereby $CH_4$, water and $O_2$ react to form CO and $H_2$ gases.

8. The process of producing hydrogen by circulating $CuCl_2$, the hydrolysis process of $CuCl_2$, the endothermic decomposition reaction in which solid $Cu_2OCl_2$ is converted to liquid $CuCl_2$ and $O_2$, the exothermic chlorination reaction of solid $CuCl_2$ and $Cl_2$ gas to form solid $Cu_2Cl_2$, and the electrolytic hydrogen production reaction in which $HCl_2$ is split into $H_2$ and $Cl_2$ using the apparatus of claim 7.

9. The system of claim 1, wherein the system is disposed in a producing well and configured such that brine and/or steam from the geothermal resource is coproduced from the geothermal resource, the brine and/or steam ascending in an annulus between the well casing and a casing or liner that contains the closed-loop down bore apparatus, thereby providing thermal energy from the geothermal resource for transfer to the closed-loop down bore apparatus.

* * * * *